(12) United States Patent
Suzuki et al.

(10) Patent No.: US 8,356,492 B2
(45) Date of Patent: Jan. 22, 2013

(54) MANUFACTURING OF GLASS

(75) Inventors: Kazuhiro Suzuki, Tokyo (JP);
Tomonari Hayashi, Tokyo (JP); Shigeru Asanuma, Tokyo (JP); Kinobu Osakabe, Tokyo (JP)

(73) Assignee: Hoya Corporation (JP)

( * ) Notice: Subject to any disclaimer, the term of this patent is extended or adjusted under 35 U.S.C. 154(b) by 27 days.

(21) Appl. No.: 12/858,781

(22) Filed: Aug. 18, 2010

(65) Prior Publication Data
US 2011/0041557 A1 Feb. 24, 2011

(30) Foreign Application Priority Data
Aug. 18, 2009 (JP) .................................. 2009-189379

(51) Int. Cl.
*C03B 5/027* (2006.01)

(52) U.S. Cl. ..................... 65/135.7; 65/135.2; 65/135.9; 65/346; 65/347

(58) Field of Classification Search ................. 65/134.1, 65/134.5, 135.8, 135.9, 346, 347
See application file for complete search history.

(56) References Cited

U.S. PATENT DOCUMENTS

| | | | | |
|---|---|---|---|---|
| 3,339,138 A | * | 8/1967 | Baker et al. | 324/717 |
| 5,158,366 A | * | 10/1992 | Nagai et al. | 374/183 |
| 5,194,081 A | * | 3/1993 | Trevelyan et al. | 65/29.21 |
| 5,364,426 A | * | 11/1994 | Richards | 65/474 |
| 5,997,977 A | * | 12/1999 | Zou et al. | 428/64.1 |
| 6,463,763 B2 | * | 10/2002 | Walser et al. | 65/178 |
| 2006/0101859 A1 | * | 5/2006 | Takagi et al. | 65/32.5 |
| 2006/0144089 A1 | | 7/2006 | Eichholz et al. | |
| 2007/0027017 A1 | * | 2/2007 | Hachitani | 501/47 |
| 2007/0089460 A1 | * | 4/2007 | Lindig et al. | 65/135.3 |

FOREIGN PATENT DOCUMENTS

| | | |
|---|---|---|
| JP | 05-004820 A | 1/1993 |
| JP | 2003-137557 A | 5/2003 |
| JP | 2003-183031 A | 7/2003 |
| JP | 2003-286031 A | 10/2003 |
| JP | 2005-053757 A | 3/2005 |
| JP | 2005-225738 A | 8/2005 |
| JP | 2006-516046 A | 6/2006 |

* cited by examiner

*Primary Examiner* — Matthew Daniels
*Assistant Examiner* — Lisa Herring
(74) *Attorney, Agent, or Firm* — Cantor Colburn LLP

(57) ABSTRACT

Glass is mass-produced with a glass melting furnace comprising a melting tank, at least a wall surface in contact with molten glass thereof being made of refractory material, at least one pair of electrodes placed so as to be in contact with the molten glass held in the melting tank for ohmically heating the molten glass held in the melting tank; and at least one metallic member, at least a surface of which is made of metal and placed so as to be substantially always in contact with the molten glass held in the melting tank. Every metallic member is, when the melting tank is filled with the molten glass, placed so as to be substantially always outside an electric current flowing region which is formed by the electrodes into the molten glass held in the melting tank.

21 Claims, 6 Drawing Sheets

MANUFACTURING OF GLASS

CROSS-REFERENCE TO RELATED APPLICATION

The present application claims priority from Japanese Patent Application No. 2009-189379, filed on Aug. 18, 2009, the contents of which are incorporated herein by reference.

BACKGROUND OF THE INVENTION

1. Field of the Invention

The present invention relates to manufacturing of glass.

2. Description of Related Art

When glass is continuously mass-produced, the following process is generally adopted. Glass material is melted in a melting tank having wall surfaces made of refractory material comprising refractory ceramic, and then the molten glass is fined. The fined molten glass is formed in a desired shape. Here, in order to melt the glass material or to maintain the molten state of the glass, flame heating in which a fossil fuel is burned with a heavy oil burner, a gas burner or the like, or ohmic heating in which electrodes are used for making electric current flow through the molten glass to heat it. When ohmic heating is used, rod-like or block-like electrodes are used. It is to be noted that such electrodes are, for example, placed on a bottom wall or a side wall of a melting tank (see, for example, JP 2003-183031 A, JP 2005-225738 A and JP H05-4820 A), or supported by electrode supporting frames which protrude vertically from a bottom wall of a melting tank (see, for example, JP 2005-53757 A).

As necessary, in a melting tank, various members are placed at positions in contact with the molten glass, including a temperature sensor for monitoring the temperature of the molten glass (see, for example, JP 2003-286031 A and JP 2005-225738 A), a bubbling member for ejecting gas in the molten glass for the purpose of homogenizing the molten glass (see, for example, JP 2005-53757 A and JP 2006-516046 A), and a pipe for introducing molten glass into the melting tank from another melting tank or for discharging the molten glass in the melting tank to the outside (see, for example, JP 2006-516046 A). It is to be noted that, because these members are required to be heat-resistant and corrosion-resistant, these members are typically formed of or coated with a metallic member made of Pt, Pt alloy, or the like which is resistant to heat and corrosion by molten glass.

Exemplary glass which is mass-produced by a glass manufacturing apparatus using the melting tank as described above includes not only glass for a vehicle and glass as a construction material, but also glass for an information recording medium used in a magnetic recording medium or the like, glass for a display such as a liquid crystal display, and glass used in precision equipment such as electronic equipment or optical equipment, for example, glass for an optical component such as a lens.

In glass manufactured by a glass manufacturing apparatus using the melting tank as described above, various foreign matters may be mixed in the process of the manufacture. Such foreign matters may cause a product defect. For example, in a case of a glass substrate for a magnetic recording medium, metal oxide particles which originate from the refractory forming the melting tank and which are taken in the glass may present themselves as minute protrusions on a surface of the substrate. It is known that such protrusions cause protrusions to be formed accordingly on a surface of the recording medium, which causes a head crush in which a head crushes against a protrusion on a surface of a magnetic disk (see JP 2003-137557 A).

A product defect caused by foreign matters is not limited to glass for a magnetic recording medium. In particular, in glass used in precision equipment described above, irrespective of the material of the foreign matters, minute foreign matters which are submicron-to-several-micron-sized and which exist in the glass or in the vicinity of a surface of the glass may cause a product defect.

For example, in a magnetic recording medium, if a minute protrusion originating from foreign matters with height about several nanometers exists on a surface of a glass substrate for the magnetic recording medium, a problem called thermal asperities may be caused in addition to the head crush described above. Further, if a vestige of a foreign matter dropped off exists on a surface of an information recording medium such as a magnetic recording medium, such a recording medium may become inferior. In a liquid crystal display, if a protrusion originating from foreign matters with height a little over a hundred and ten nanometers exists on a surface of a glass substrate for the display, problems such as a break in electrode wiring of a pixel arise. Such problems may also arise on other displays than liquid crystal displays, affected by foreign matters having somewhat different size. In an optical device, foreign matters lager than the order of the wavelength of the light used cause problems such as light scattering.

As described in JP 2003-137557 A, the inventors of the present invention seeks to eliminate foreign matters in glass used for various applications, using a technology for suppressing defects due to foreign matters which originate from the refractory forming the melting tank, and the like. However, even when foreign matters originating from the refractory are suppressed, in mass production of the glass for a long period of time, the number of product defects caused by particles of metal such as Pt may suddenly increase with time at a certain point and become non-negligible in securing the yield of the product.

SUMMARY OF THE INVENTION

The present invention has been made in view of the above. An object of the present invention is to provide a glass manufacturing method which suppresses, even when glass is mass-produced for a long period of time, mixture of metal particles as foreign matters in the glass, as well as a glass melting furnace and a glass manufacturing apparatus used therein. Another object of the present invention is to provide a glass blank manufacturing method, a method of manufacturing a substrate for an information recording medium, an information recording medium manufacturing method, a method of manufacturing a substrate for a display, and an optical component manufacturing method.

The above-mentioned objects can be attained by the following aspects of the present invention. A glass manufacturing method according to a first aspect of the present invention is a method for mass-producing glass with a glass melting furnace, the glass melting furnace comprising: a melting tank, at least a wall surface in contact with molten glass thereof being made of refractory material; at least one pair of electrodes placed so as to be in contact with the molten glass held in the melting tank for ohmically heating the molten glass held in the melting tank; and at least one metallic member, at least a surface of which is made of metal and placed so as to be substantially always in contact with the molten glass held in the melting tank; wherein: every one of the at least one metallic member is, when the melting tank is filled with the molten glass, placed so as to be substantially always outside an electric current flowing region which is formed by the at least one pair of electrodes into the molten glass held in the melting tank.

In one mode of the glass manufacturing method according to the first aspect of the present invention, it is preferred that each of the at least one metallic member is placed in a mode selected from the group consisting of: a mode in which it is movably placed so as to be substantially always outside the electric current flowing region; and a mode in which it is fixedly placed so as to be substantially always outside the electric current flowing region.

In another mode of the glass manufacturing method according to the first aspect of the present invention, it is preferred that the mass-producing of glass is carried by alternately repeating a melting step of charging glass material in the melting tank and melting the glass material and a discharge step of discharging from the melting tank the molten glass prepared by melting the glass material through the melting step.

In another mode of the glass manufacturing method according to the first aspect of the present invention, it is preferred that the melting tank is connected to a glass supply source that is one of a molten glass flow inlet through which the molten glass substantially continuously flows in the melting tank and a glass material charge inlet through which glass material is charged substantially continuously, and to a molten glass discharge outlet through which the molten glass is continuously discharged; and wherein: the mass producing of glass is carried by substantially continuously discharging, according to one of an inflow of the molten glass which flows through the molten glass flow inlet into the melting tank substantially continuously and an input of the glass material charged through the glass material charge inlet into the melting tank substantially continuously, the molten glass from the melting tank which is always filled with the molten glass.

It is to be noted that, in the above-mentioned modes, in the mass-producing glass, there may be a period during which supply of the glass material to the melting tank is temporarily suspended.

In another mode of the glass manufacturing method according to the first aspect of the present invention, it is preferred that the metal is at least one metal selected from the group consisting of platinum, platinum alloy, and strengthened platinum. Strengthened platinum is oxide dispersed platinum alloy in which oxide is dispersed in platinum or in platinum alloy.

In another mode of the glass manufacturing method according to the first aspect of the present invention, it is preferable that the metallic member comprises at least one instrument selected from the group consisting of (1) a protective member of a temperature detector, the temperature detector including a temperature sensor and the protective member which covers the temperature sensor and at least a surface of which is made of metal, (2) an agitator which is used for agitating the molten glass and at least a surface of which is made of metal, (3) a pipe which is used for making the molten glass flow therethrough and at least a surface of which is made of metal, and (4) a gas ejector which is used for bubbling the molten glass and at least a surface of which is made of metal.

In another mode of the glass manufacturing method according to the first aspect of the present invention, it is preferred that the molten glass held in the melting tank have a temperature in a range of 1,200° C.-1,700° C.

A glass manufacturing method according to a second aspect of the present invention is a method for mass-producing glass with a glass melting furnace, the glass melting furnace comprising: a melting tank, at least a wall surface in contact with molten glass thereof being made of refractory material; at least one pair of electrodes placed so as to be in contact with the molten glass held in the melting tank for ohmically heating the molten glass held in the melting tank; and at least one metallic member, at least a surface of which is made of metal and placed so as to be substantially always in contact with the molten glass held in the melting tank, wherein: the wall surface is eroded as cumulative contact time between the molten glass and the wall surface increases to form two kinds of erosion surfaces, one of which is a low erosion region being away from the at least one pair of electrodes and having a relatively small amount of erosion of the wall surface and another of which is a high erosion region being in a vicinity of the at least one pair of electrodes and having a relatively large amount of erosion of the wall surface, and wherein: every one of the at least one metallic member is fixedly placed in advance before a start of mass producing of glass so as to be substantially flush with a wall surface which may be in the low erosion region at an end of the mass producing of glass.

In one mode of the glass manufacturing method according to the second aspect of the present invention, it is preferred that the mass-producing of glass is carried by alternately repeating a melting step of charging glass material in the melting tank and melting the glass material and a discharge step of discharging from the melting tank the molten glass prepared by melting the glass material through the melting step.

In another mode of the glass manufacturing method according to the second aspect of the present invention, it is preferred that the melting tank is connected to a glass supply source that is one of a molten glass flow inlet through which the molten glass substantially continuously flows in the melting tank and a glass material charge inlet through which glass material is charged substantially continuously, and to a molten glass discharge outlet through which the molten glass is continuously discharged; and wherein: the mass producing of glass is carried by substantially continuously discharging, according to one of an inflow of the molten glass which flows through the molten glass flow inlet into the melting tank substantially continuously and an input of the glass material charged through the glass material charge inlet into the melting tank substantially continuously, the molten glass from the melting tank which is always filled with the molten glass.

It is to be noted that, in the above-mentioned modes, in the mass-producing glass, there may be a period during which supply of the glass material to the melting tank is temporarily suspended.

In another mode of the glass manufacturing method according to the second aspect of the present invention, it is preferred that the metal is at least one metal selected from the group consisting of platinum, platinum alloy, and strengthened platinum. Strengthened platinum is oxide dispersed platinum alloy in which oxide is dispersed in platinum or in platinum alloy.

In another mode of the glass manufacturing method according to the first aspect of the present invention, it is preferable that the metallic member comprises at least one instrument selected from the group consisting of (1) a protective member of a temperature detector, the temperature detector including a temperature sensor and the protective member which covers the temperature sensor and at least a surface of which is made of metal, (2) an agitator which is used for agitating the molten glass and at least a surface of which is made of metal, (3) a pipe which is used for making the molten glass flow therethrough and at least a surface of which is made of metal, and (4) a gas ejector which is used for bubbling the molten glass and at least a surface of which is made of metal.

In another mode of the glass manufacturing method according to the second aspect of the present invention, it is preferred that the molten glass held in the melting tank have a temperature in a range of 1,200° C.-1,700° C.

A glass blank manufacturing method according to another aspect of the present invention is a method for manufacturing glass blank, using a glass manufacturing method for mass-producing glass with a glass melting furnace, the glass melting furnace comprising: a melting tank, at least a wall surface in contact with molten glass thereof being made of refractory material; at least one pair of electrodes placed so as to be in contact with the molten glass held in the melting tank for ohmically heating the molten glass held in the melting tank; and at least one metallic member, at least a surface of which is made of metal and placed so as to be substantially always in contact with the molten glass held in the melting tank; wherein: every one of the at least one metallic member is, when the melting tank is filled with the molten glass, placed so as to be substantially always outside an electric current flowing region which is formed by the at least one pair of electrodes into the molten glass held in the melting tank.

In one mode of the glass blank manufacturing method according to the present invention, it is preferred that the glass blank is used to manufacture any member selected from the group consisting of a substrate for an information recording medium, a substrate for a display, and an optical component.

A method of manufacturing a substrate for an information recording medium according to the another aspect of the invention comprises steps of: manufacturing a glass blank by a glass manufacturing method for mass-producing glass with a glass melting furnace, the glass melting furnace comprising: a melting tank, at least a wall surface in contact with molten glass thereof being made of refractory material; at least one pair of electrodes placed so as to be in contact with the molten glass held in the melting tank for ohmically heating the molten glass held in the melting tank; and at least one metallic member, at least a surface of which is made of metal and placed so as to be substantially always in contact with the molten glass held in the melting tank; wherein: every one of the at least one metallic member is, when the melting tank is filled with the molten glass, placed so as to be substantially always outside an electric current flowing region which is formed by the at least one pair of electrodes into the molten glass held in the melting tank; and grinding/polishing a main surface of the glass blank to manufacture a substrate for an information recording medium.

A method of manufacturing a substrate for an information recording medium according to the another aspect of the invention comprises steps of: manufacturing a glass blank by a glass manufacturing method for mass-producing glass with a glass melting furnace, the glass melting furnace comprising: a melting tank, at least a wall surface in contact with molten glass thereof being made of refractory material; at least one pair of electrodes placed so as to be in contact with the molten glass held in the melting tank for ohmically heating the molten glass held in the melting tank; and at least one metallic member, at least a surface of which is made of metal and placed so as to be substantially always in contact with the molten glass held in the melting tank; wherein: every one of the at least one metallic member is, when the melting tank is filled with the molten glass, placed so as to be substantially always outside an electric current flowing region which is formed by the at least one pair of electrodes into the molten glass held in the melting tank; and grinding and/or polishing a main surface of the glass blank to form a substrate for an information recording medium.

An information recording medium manufacturing method according to another aspect of the invention comprises steps of: manufacturing a glass blank by a glass manufacturing method for mass-producing glass with a glass melting furnace, the glass melting furnace comprising: a melting tank, at least a wall surface in contact with molten glass thereof being made of refractory material; at least one pair of electrodes placed so as to be in contact with the molten glass held in the melting tank for ohmically heating the molten glass held in the melting tank; and at least one metallic member, at least a surface of which is made of metal and placed so as to be substantially always in contact with the molten glass held in the melting tank; wherein: every one of the at least one metallic member is, when the melting tank is filled with the molten glass, placed so as to be substantially always outside an electric current flowing region which is formed by the at least one pair of electrodes into the molten glass held in the melting tank; grinding and/or polishing a main surface of the glass blank to form a substrate; and forming an information recording layer on the main surface of the substrate to produce an information recording medium.

A method of manufacturing a substrate for a display according to another aspect of the invention comprises steps of: manufacturing a glass blank by a glass manufacturing method for mass-producing glass with a glass melting furnace, the glass melting furnace comprising: a melting tank, at least a wall surface in contact with molten glass thereof being made of refractory material; at least one pair of electrodes placed so as to be in contact with the molten glass held in the melting tank for ohmically heating the molten glass held in the melting tank; and at least one metallic member, at least a surface of which is made of metal and placed so as to be substantially always in contact with the molten glass held in the melting tank; wherein: every one of the at least one metallic member is, when the melting tank is filled with the molten glass, placed so as to be substantially always outside an electric current flowing region which is formed by the at least one pair of electrodes into the molten glass held in the melting tank; and using the glass blank to produce a substrate for a display.

An optical component manufacturing method according to the another aspect of the invention comprises steps of: manufacturing a glass blank by a glass manufacturing method for mass-producing glass with a glass melting furnace, the glass melting furnace comprising: a melting tank, at least a wall surface in contact with molten glass thereof being made of refractory material; at least one pair of electrodes placed so as to be in contact with the molten glass held in the melting tank for ohmically heating the molten glass held in the melting tank; and at least one metallic member, at least a surface of which is made of metal and placed so as to be substantially always in contact with the molten glass held in the melting tank; wherein: every one of the at least one metallic member is, when the melting tank is filled with the molten glass, placed so as to be substantially always outside an electric current flowing region which is formed by the at least one pair of electrodes into the molten glass held in the melting tank; and grinding and/or polishing a main surface of the glass blank to form an optical component.

A glass manufacturing method according to another aspect of the invention is a method for mass-producing glass with a glass melting furnace by; filing a melting tank of the glass melting furnace with molten glass; ohmically heating the molten glass held in the melting tank by means of at least one pair of electrodes placed so as to be in contact with the molten glass; and placing at least one metallic member, of which at least a surface is made of metal, to contact with the molten glass; wherein every one of the at least one metallic member is placed outside an effective electric current flowing region formed by the at least one pair of electrodes into the molten glass.

The effective electric current flowing region may comprise an opposing region in which each pair of the electrodes are immediately opposed to each other plus a peripheral region up to 60° upward and up to 30° sideways and downward from ends of the electrodes from the opposing region.

Each of the at least one metallic member may be placed movably or fixedly outside the effective electric current flowing region at least in the ohmically heating.

Mass-producing of glass may be carried by alternately repeating: a melting step of charging glass material in the melting tank and melting the glass material through the filing and the ohmically heating; and a discharge step of discharging from the melting tank the molten glass prepared by melting the glass material through the melting step.

Mass-producing of glass may be carried by: supplying molten glass or glass material continuously to the melting tank to carry the filling and the ohmically heating;

and discharging molten glass continuously from the melting tank in accordance with the amount of the molten glass or the glass material supplied to the melting tank.

A glass manufacturing method according to another aspect of the invention is a method for mass-producing glass with a glass melting furnace by: filing a melting tank of the glass melting furnace with molten glass; ohmically heating the molten glass held in the melting tank by means of at least one pair of electrodes placed so as to be in contact with the molten glass; and placing at least one metallic member, of which at least a surface is made of metal, to contact with the molten glass; wherein the placing is carried before the start of the mass-producing of glass for every one of the at least one metallic member to be fixedly placed away from the at least one pair of electrodes in a low erosion region where erosion caused by increasing of cumulative contact between the molten glass held in the melting tank and the wall surface of the melting tank is estimated to be smaller then that of the other region at the end of the mass-producing of glass, substantially flush with the wall surface of the melting tank.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
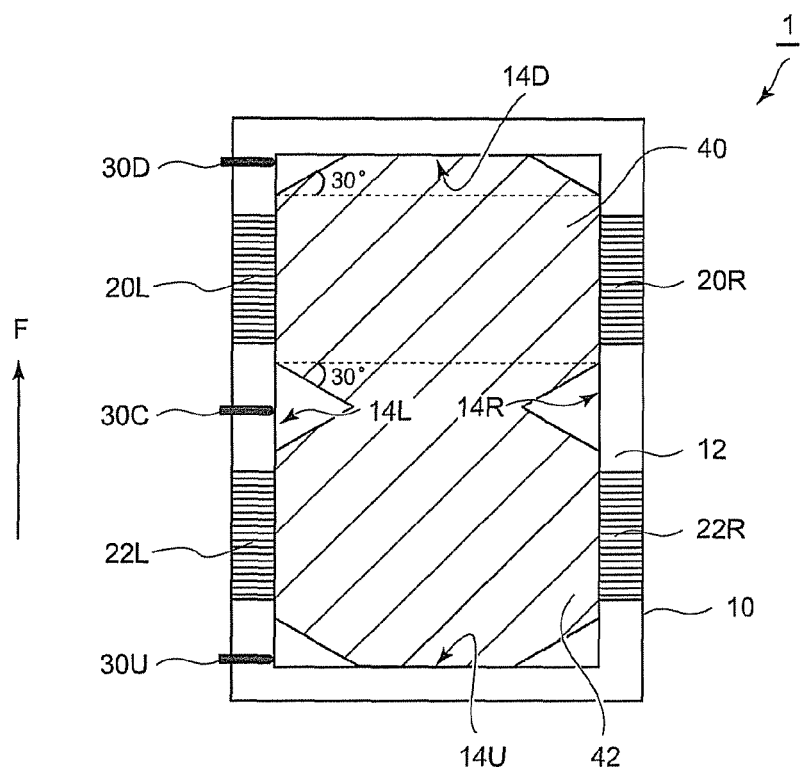
FIG. 1 is an explanatory diagram for explaining an exemplary glass manufacturing method of an embodiment and an exemplary glass melting furnace used therein.

[Glass Manufacturing Method, Glass Melting Furnace, and Glass Manufacturing Apparatus]

A glass manufacturing method of a first embodiment is a method for mass-producing glass with a glass melting furnace, the glass melting furnace comprising a melting tank, at least a wall surface in contact with molten glass thereof being made of refractory material; at least one pair of electrodes placed so as to be in contact with the molten glass held in the melting tank for ohmically heating the molten glass held in the melting tank, and at least one metallic member, at least a surface thereof being made of metal and the surface being placed so as to be substantially always in contact with the molten glass held in the melting tank, wherein every one of the at least one metallic member is, when the melting tank is filled with the molten glass, placed so as to be substantially always outside an electric current flowing region which is formed by the at least one pair of electrodes into the molten glass held in the melting tank.

A glass melting furnace of the first embodiment is the glass melting furnace used in the glass manufacturing method of the first embodiment described above. A glass manufacturing apparatus according to this embodiment comprises at least one ohmic heating melting furnace for heating molten glass by ohmic heating wherein, all the ohmic heating melting furnaces are glass melting furnaces which are selected among the glass melting furnaces according to the first embodiment and glass melting furnaces according to a second embodiment which is described below.

In the glass manufacturing method of the first embodiment, when the melting tank is filled with molten glass, every metallic member which is substantially always in contact with molten glass is placed outside the electric current flowing region. Therefore, even when glass is mass-produced for a long period of time, mixture of metal particles as foreign matters in the glass can be suppressed.

The reason why such an effect can be obtained is that, when the melting tank is filled with molten glass in mass production of glass, because every metallic member which is substantially always in contact with molten glass is placed outside the electric current flowing region, corrosion due to electric discharge from the surface of each metallic member caused by electric current flowing through the metallic member can be prevented. More specifically, in the glass manufacturing method according to the first embodiment, because discharge breakdown at the surface of each metallic member is prevented, metal of each metallic member is suppressed to separate in the molten glass.

It is to be noted that the inventors of this invention reached the conclusion described above based on the following findings. First, the inventors found the following tendency of the number of metal particles included in glass per unit weight in mass production of glass for a long period of time using a glass manufacturing apparatus which includes a plurality of series-connected melting tanks and in which glass is continuously mass-produced while glass material is charged from a melting tank on an upstream side and molten glass is discharged from a melting tank on a downstream side to a downstream process side by an amount according to the amount of the charged glass material. The inventors found that, although the number of the metal particles is relatively small during a time period from immediately after the glass manufacturing apparatus is newly installed or receives maintenance (an early stage of mass production) to a middle stage of mass production, there is a tendency of the number of the metal particles to suddenly increase in the course of time at a late stage of mass production. Further, the present inventors examined the material of the metal particles and confirmed that the material is the same as that of the metallic members which is resistant to corrosion by the molten glass, such as Pt used in a melting tank of the glass manufacturing apparatus or in a flow path portion for connecting melting tanks. From these, it was made clear that the source of the metal particles included in the glass is the metallic members in contact with molten glass which are used at various places in the glass manufacturing apparatus. However, these metallic members are to be used at various places in the glass manufacturing apparatus for various purposes. Therefore, it is difficult to precisely specify the main source of the metal particles. One way to completely eliminate the metal particles may be to use no metallic member in contact with molten glass, which is not practical.

Meanwhile, the inventors of this invention examined inside conditions of melting tanks of glass manufacturing apparatuses after mass production and before maintenance and found that, in melting tanks used for fining molten glass, that is, in fining tanks, metallic protective layers made of Pt or Pt alloy, which constitute temperature detectors for monitoring the temperature of molten glass in respective fining tanks, were considerably corroded. Each of the metallic protective layers is to cover a surface of refractory ceramic cover provided for the purpose of protecting a thermocouple from molten glass. On the other hand, no corrosion or other failures were recognized with regard to metallic members made of Pt or Pt alloy which are used in glass manufacturing apparatuses at other places. Taking these points into consideration, it is clear that sources of metal particles included in glass are metallic protective layers.

Therefore, based on this fact, the inventors examined inside conditions of fining tanks after mass production and before maintenance further in detail, and found the following facts (1)-(5):

(1) with regard to a rod-like temperature detector, placed in a refractory forming side wall surfaces of a fining tank so as to be completely embedded except for a tip portion thereof before mass production, not only the tip portion but also the root side thereof were brought into contact with molten glass by erosion of the refractory by molten glass associated with the progress of mass production;

(2) with regard to block-like electrodes for ohmic heating, placed in the refractory forming the side wall surfaces of the fining tank so as to be flush with the side wall surfaces respectively before mass production, and with regard to portions of the refractory placed in the vicinity of the electrodes, the amount of erosion thereof was considerably larger than that of portions of the refractory at other positions placed so as to be in contact with molten glass;

(3) with regard to a rod-like temperature detector embedded in the refractory at the vicinity of the electrodes such that only the tip portion thereof is exposed to be able to be in contact with molten glass before mass production, a corrosion trace was observed from the tip portion to the root side thereof in a metallic protective layer therein in contact with molten glass;

(4) the corrosion trace in the above (3) existed mainly at two positions away from each other on the metallic protective layer; and (5) with regard to a rod-like temperature detectors placed so as to be embedded in a portion of the refractory away from the electrodes before mass production, no corrosion trace was observed in the metallic protective layer therein in contact with molten glass.

Taking into consideration the above-mentioned facts (1)-(5), in the process of mass-producing glass, the following phenomenon is assumed to occur in a fining tank. First, with regard to electrodes and portions in the vicinity thereof, because, in addition to erosive power of molten glass itself, effect of promoting erosion due to electric current flowing through molten glass in the vicinity of the electrodes is contributory, it can be supposed that the erosive power is larger than that at a position away from the electrodes. More specifically, a high current density region is formed in the vicinity of an electrode placed in a side wall surface of a fining tank between the electrode and another electrode placed so as to be electrically paired with the electrode, and it can be supposed that the amount of erosion of a portion of the refractory in the vicinity of the region is considerably larger than that of portions of the refractory in other regions.

Figure 8:
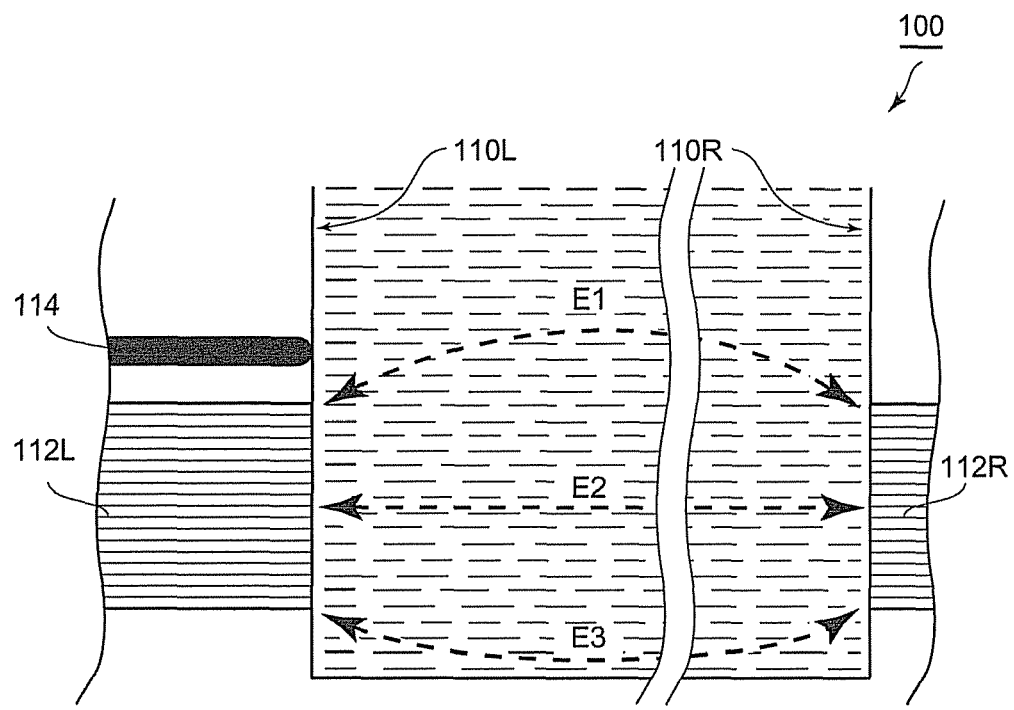
FIG. 8 shows a schematic view illustrating exemplary erosion and exemplary electric current paths at an early stage of mass production in a conventional melting tank.

Here, as a specific example of the state of a conventional melting tank described above, as illustrated in FIG. 8, a fining tank 100 filled with molten glass immediately after a start of mass production is assumed to include a pair of block-like electrodes 112R and 112L embedded in side wall surfaces 110R and 110L, respectively, which are made of refractory material and are opposed to each other, and a rod-like temperature detector 114 placed so as to be embedded in the side wall surface 110L in the vicinity of the electrode 112L and having a metallic protective layer provided on a surface thereof. In the example illustrated in FIG. 8, basically, electric current mainly flows along current paths E1, E2, and E3 which connect the pair of opposing block-like electrodes 112R and 112L such that the lengths of the line segments formed by the connection are substantially the shortest as illustrated by broken lines in the figure. In this case, the rod-like temperature detector 114 placed in the vicinity of the electrode 112L is completely embedded in the side wall surface 110L made of refractory material except for a tip portion thereof and the tip portion is flush with the block-like electrode 112L for ohmic heating immediately after the start of mass production, and thus, clearly, the rod-like temperature detector 114 is positioned outside the high current density region. Therefore, it is thought that, for some time after the start of mass production, almost no electric current flows through the metallic protective layer (the early stage).

Figure 9:
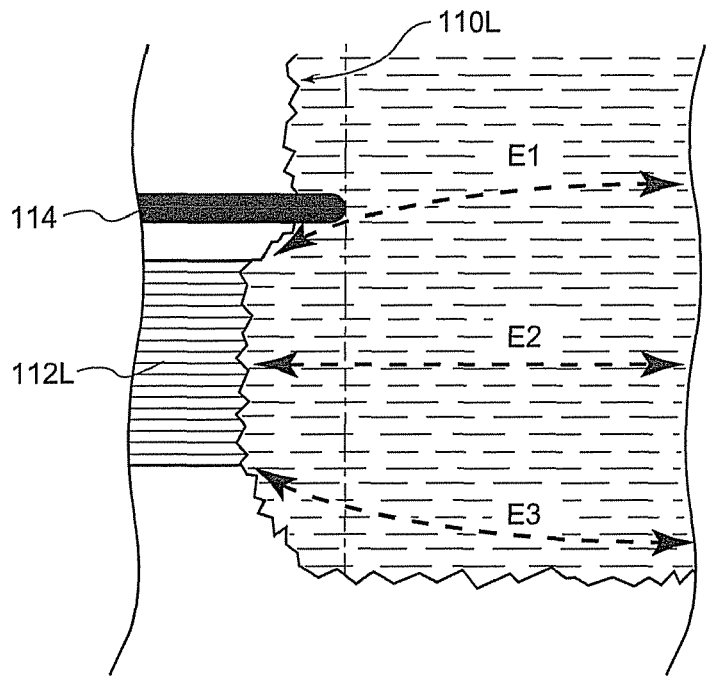
FIG. 9 shows a schematic view illustrating exemplary erosion and exemplary electric current paths at a middle stage of mass production in the conventional melting tank.

Then, at the middle stage of mass production, because erosion of the side wall surface 110L made of refractory material and the electrode 112L which are in contact with molten glass progresses to some extent, not only the tip portion but also a root side of the temperature detector is exposed to molten glass to some extent (see FIG. 9). FIG. 9 illustrates a state at the middle stage of mass production in which erosion of the side wall surface 110L illustrated in FIG. 8 progresses to some extent. The alternate long and short dashed line in FIG. 9 designates the position of the side wall surface 110L and the electrode 112L at the early stage of mass production illustrated in FIG. 8. More specifically, as illustrated in FIG. 9, the rod-like temperature detector 114 protrudes to some extent from the side wall surface 110L which is degraded due to erosion. With regard to the electrode 112L and the portion of the side wall surface 110L made of refractory material in the vicinity thereof, erosion also progresses and the wall surface is degraded. Therefore, the tip portion of the temperature detector 114 placed in the vicinity of the electrode 112L reaches the high current density region in the vicinity of the electrode 112L. When the tip portion of the temperature detector 114 reaches the high current density region in this way, because the electrical resistance in the metallic protective layer is lower than that in molten glass, the metallic protective layer is potentially extremely likely to allow electric current to flow therethrough. However, when the tip portion of the temperature detector 114 just reaches the high current density region, it is difficult to form an electric current path which is enough to cause a sufficient potential difference in the metallic protective layer. Therefore, at this stage, also, it is assumed that electric current which is enough to cause metallic corrosion due to electric discharge does not flow through the metallic protective layer (the middle stage).

Figure 10:
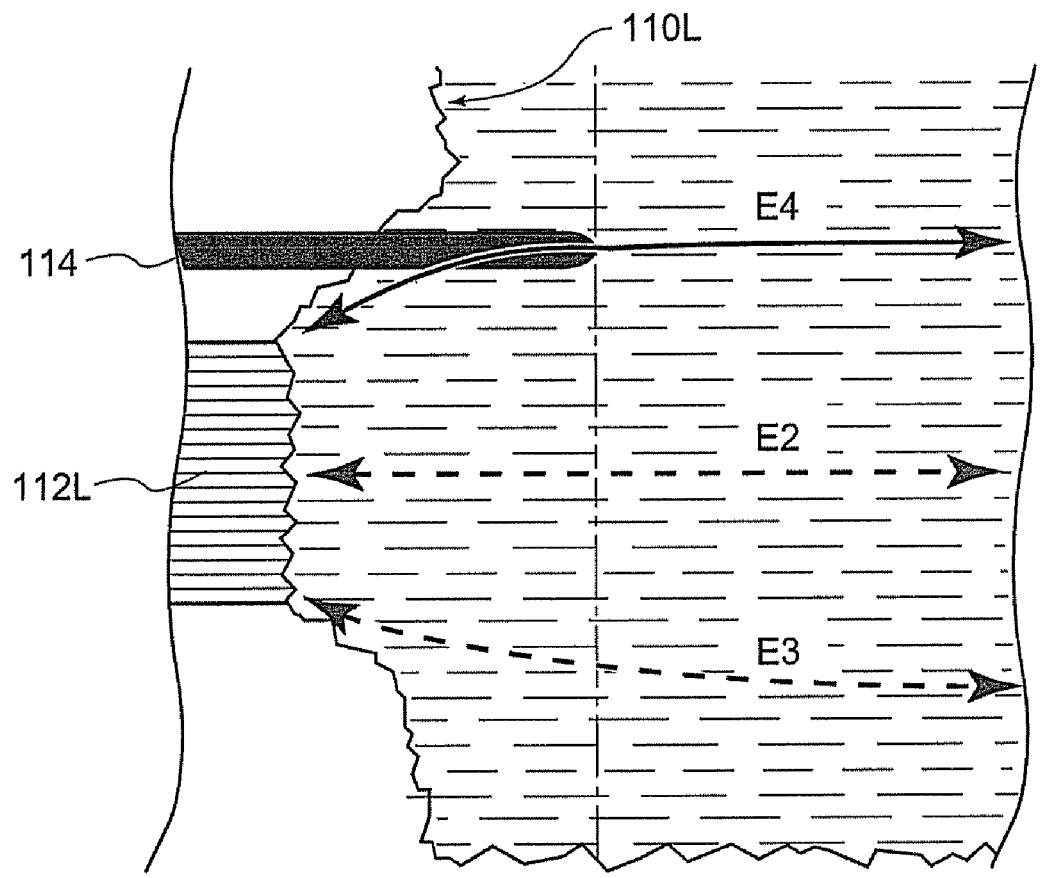
FIG. 10 shows a schematic view illustrating exemplary erosion and exemplary electric current paths at a late stage of mass production in the conventional melting tank.

However, at the late stage of mass production, because erosion of the side wall surface 110L made of refractory material and the electrode 112L which are in contact with molten glass progresses further, the temperature detector 114 is exposed to molten glass from the tip portion thereof down to the root side thereof (see FIG. 10). FIG. 10 illustrates a state at the late stage of mass production in which erosion of the side wall surface 110L illustrated in FIG. 9 progresses further. The alternate long and short dashed line in FIG. 10 designates the position of the side wall surface 110L and the electrode 112L at the early stage of mass production illustrated in FIG. 8. More specifically, the rod-like temperature detector 114 significantly protrudes from the side wall surface 110L which is degraded due to erosion. Therefore, not only the tip portion but also the root side of the temperature detector 114 placed in the vicinity of the electrode 112L reaches the high current density region in the vicinity of the electrode 112L. Further, the tip portion reaches a region in which the current density is higher than that of the region the tip portion reaches at the middle stage. Still further, with regard to the electrode 112L and the portion of the side wall surface 110L made of refractory material in the vicinity thereof, erosion progresses further and the wall surface is significantly degraded. Therefore, an current path E4 is more likely to be formed so that electric current flows from (A) the region in which the current density is higher through (B) the metallic protective layer positioned in the region in which the current density is higher (the tip portion of the temperature detector 114 in the vicinity of the electrode 112L) and (C) the metallic protective layer positioned in the high current density region (the root side of the temperature detector 114 in the vicinity of the electrode 112L) to (D) the electrode 112L or so that electric current flows in the reverse direction.

It can be supposes that, because the tip portion of the temperature detector 114 reaches the region in which the current density is higher than that of the region the tip portion reaches at the middle stage, the potential difference in the current path E4 is remarkably larger than that at the middle stage. Therefore, once electric current starts to flow through the current path E4, it is assumed that, because large electric current flows through the metallic protective layer, corrosion of the metallic protective layer is caused to separate the metal in molten glass, with the result that a large number of metal particles are separated into the glass (the late stage).

It is to be noted that, regarding capability for electric current to flow, the current path E4 in which electric current flows through the above-mentioned (A)-(D) including the metallic protective layer having the electrical resistance that is lower than that of molten glass is advantageous over the current paths E2 and E3 in which electric current flows from an electrode of positive polarity through only molten glass to an electrode of negative polarity. Therefore, it is thought that, once the current path E4 through (A)-(D) is formed, the state is maintained until the end of mass production and that the amount of electric current which flows through the current path E4 increases in the course of time. This is clearly supported by the fact that, at the late stage of mass production, the number of the metal particles included in the glass suddenly increases. Further, places at which electric discharge is made between the metallic protective layer and molten glass, that is, a start point and an end point on the temperature detector 114 of the current path E4 of electric current flowing through the metallic protective layer are thought to be the two places referred to in the above (B) and (C). This is clearly supported by the fact that the corrosion trace exists mainly at two positions away from each other on the metallic protective layer as referred to in the above-mentioned fact (4).

From the above description, it is clear that, in mass production of glass using at least an ohmic heating melting tank as heating means, by placing every metallic member in contact with molten glass outside the high current density region from the early stage to the late stage of mass production of the glass, even when the glass is mass-produced for a long period of time, mixture of the metal particles as foreign matters in the glass can be suppressed. Accordingly, based on the above findings, the inventors of this invention have come up with the glass manufacturing method according to the first embodiment described above. There will be described details of the glass manufacturing method according to the first embodiment and the glass melting furnace according to the first embodiment which uses the glass manufacturing method.

The glass melting furnace which is used in the glass manufacturing method according to the first embodiment is used in a glass manufacturing apparatus for mass-producing glass, and may be used in any one of a batch production glass manufacturing apparatus and a continuous production glass manufacturing apparatus.

"Glass is mass-produced" as used herein means that the cumulative time in which the refractory is in contact with molten glass is three months or more. The refractory (for example, the refractory forming a bottom wall surface and a bottom wall surface side of the side wall surfaces of the melting tank) are always in contact with molten glass when glass is molten during the whole period from the start of mass production immediately after the glass melting furnace is newly installed or receives maintenance until the end of mass production determined by the useful life of the furnace, the timing of the maintenance, or the like except for emergency stop due to an accident or the like (the period is hereinafter sometimes referred to as "operating period"). It is to be noted that, in a continuous production glass manufacturing apparatus, during an operating period, normally, molten glass is always held in the melting tank, and thus, the cumulative contact time mentioned above is substantially equal to the operating period. The cumulative contact time is appropriately selected depending on the structure of the glass melting furnace, conditions of the melting, the quality required of the produced glass, or the like, and typically in a range of from one to two years to a little over ten years.

At least the wall surfaces in contact with molten glass of the melting tank are made of refractory material. Normally, the whole inner wall surfaces have a substantially sealed structure formed of a refractory. The refractory can be appropriately selected from various refractories according to the glass material to be molten and the melting temperature. For example, an $Al_2O_3$—$ZrO_2$—$SiO_2$-based (AZS-based) or alumina-based electrocast brick or a burned brick may be used.

When glass is mass-produced by batch production, glass is mass-produced by alternately repeating a melting step of charging glass material in the melting tank and melting the glass material, and a discharge step of discharging from the melting tank molten glass prepared by melting the glass material through the melting step. More specifically, in production of a batch of glass, after charging and melting the glass material in the melting tank, fining, viscosity control, and the like are performed with regard to the molten glass. Then, the molten glass is discharged (or moved) to the outside of the melting tank to be used in a downstream process such as forming. In batch production, during the operating period, the melting step and the discharge step are alternately repeated many times. It is to be noted that, normally, the number of the repetitions is preferably five or more in the operating period. The timing in performing the discharge step is not specifically limited, but it is preferred that the discharge step is performed in the daytime during which an operator of the melting furnace can be easily got hold of. Further, if the melting step is performed overnight, the temperature of molten glass in the melting tank may be set to be, for example, a temperature which is appropriate for operation during daytime and a temperature at which the molten glass is not solidified during nighttime. This can save the energy cost necessary for heating the molten glass, while the operation of producing glass can be restarted with ease.

When glass is mass-produced by continuous production, the melting tank is connected to a glass supply source and a molten glass discharge outlet. Normally, the molten glass discharge outlet is connected to the melting tank on a side substantially opposite to a side on which the glass supply source is connected. The glass supply source may be, for example, a molten glass flow inlet through which molten glass flows in the melting tank substantially continuously, or a glass material charge inlet through which glass material is charged substantially continuously. "Glass material is charged substantially continuously" as used herein means not only a case in which glass material continues to be charged always continuously but also a case in which lowering of the liquid level of molten glass in the melting tank is sensed by a sensor or the like and glass material are charged sequentially in small quantities such that the liquid level returns to a predetermined level. "Molten glass flows in the melting tank substantially continuously" as used herein means not only a case in which molten glass flows in the melting tank continuously, but also includes a case in which molten glass flows in sequentially in small quantities. This is because, when a molten glass flow inlet as the glass supply source is connected to the melting tank, another melting tank to which a glass material charge inlet for continuously or sequentially charging glass material as the glass supply source is connected is to be placed on an upstream side of the melting tank. It is to be noted that whether a molten glass flow inlet or a glass material charge inlet is connected to the melting tank is appropriately selected according to the intended use of the melting tank. For example, if the main purpose is to melt glass material, a glass material charge inlet is connected to the melting tank. If the main purpose is to fine molten glass, to control the viscosity of molten glass, or the like, a molten glass flow inlet is connected to the melting tank. In continuous production, glass is mass-produced by substantially continuously discharging, according to any one of the inflow of molten glass which flows through the molten glass flow inlet in the melting tank substantially continuously and the input of glass material charged through the glass material charge inlet in the melting tank substantially continuously, molten glass from the melting tank which is always filled with molten glass.

Further, in continuous production, as necessary, there may be provided a period during which supply of glass material to the melting tank is temporarily suspended, that is, a temporary suspension period. Such a temporary suspension period may be provided when, for example, production of glass is required to be temporarily suspended during nighttime or for the purpose of production adjustment. The temporary suspension period leads to the state in which, because supply of glass material to the melting tank stops, molten glass is not discharged from the melting tank according to the supply of glass material, that is, a production halt. However, the molten state of molten glass filling the melting tank is maintained even during the temporary suspension period so that production can be restarted at any time. During the temporary suspension period, in order to reduce the energy cost necessary for heating the molten glass, it is preferred that the temperature of the molten glass in the melting tank be set and maintained at a level at which the molten glass is not solidified. It is to be noted that the ratio of the temporary suspension period in the operating period is preferably 50% or less, and more preferably 30% or less.

The electrodes are placed so as to be in contact with molten glass held in the melting tank. In this way, molten glass held in the melting tank is heated by ohmic heating. As the material of the electrodes, materials which have excellent heat resistance and corrosion resistance and which are conductive at least in a high temperature range in which glass is molten may be used, including tin oxide, molybdenum, platinum, and alloys of platinum such as a platinum-rhodium alloy. Among them, tin oxide is preferred because of its excellent oxidation resistance and usability with low-frequency electric current which enables simplification of a power source facility. The shape of the electrodes is not specifically limited, and may be, for example, like a rod or a block. When rod-like electrodes are used, the electrodes may be placed, for example, so as to pierce the side wall surfaces or the bottom wall surface in contact with molten glass or so as to be submerged in molten glass from above the liquid level of the molten glass. When block-like electrodes are used, the electrodes may be placed, for example, so as to be embedded in the side wall surfaces or the bottom wall surface in contact with molten glass. It is to be noted that exemplary materials suitable for block-like electrodes include tin oxide while exemplary materials suitable for rod-like electrodes include molybdenum.

At least a pair of electrodes are necessary, but the number of the electrodes is not specifically limited and may be appropriately selected according to the size of the melting tank and the like. However, in order to heat molten glass held in the melting tank more uniformly, it is preferred that two or more pairs of electrodes are used. In this case, it is preferred that the electrodes are placed substantially symmetrically with respect to the direction of flow of molten glass flowing through the melting tank. In ohmic heating, the electric current allowed to flow across the electrodes may be direct current or alternating current, and may be appropriately selected. It is to be noted that, in addition to ohmic heating in which molten glass is heated by making electric current flow therethrough, as necessary, flame heating in which combustion flame given by a heavy oil burner, a gas burner, or the like is blown on the liquid level of molten glass or on glass material, radiant heating in which heat is radiated from a heat source such as a heater placed above the liquid level of molten glass, or the like may be used in combination therewith.

At least surfaces of the metallic members are made of metal and the metallic members are placed such that the surfaces are substantially always in contact with molten glass held in the melting tank. The "metal" forming the metallic member as used herein means metal which is resistant to heat and corrosion by molten glass, and is appropriately selected depending on the temperature, composition, and the like of molten glass. It is to be noted that examples of such metal include Pt and Pt alloy which can be applicable irrespective of the temperature and composition of molten glass. In addition to Pt and Pt alloy, for example, strengthened platinum, iridium, and the like are included. "Substantially always in contact with molten glass" as used herein means, in batch production, being in contact with molten glass for a period which is 30% or more of the whole period in which the melting step is performed during the operating period, and, in continuous production, being in contact with molten glass for a period which is 30% or more of the whole operating period. It is to be noted that, in both of the two kinds of production, the period of being in contact with molten glass is preferably 90% or more and most preferably 100% of the whole period in which the melting step is performed during the operating period or of the whole operating period.

Specific examples of such metallic members include: (1) a protective member of a temperature detector, the temperature detector including a temperature sensor and the protective member which covers the temperature sensor and at least the surface of which is made of metal; (2) an agitator which is used for agitating molten glass and at least the surface of which is made of metal; (3) a pipe which is used for molten glass to flow therethrough and at least the surface of which is made of metal; and (4) a gas ejector which is used for bubbling molten glass and at least the surface of which is made of metal. It is to be noted that the metallic members are not limited to the above-mentioned examples, and may be, for example, a simple rod-like or plate-like metal.

It is to be noted that the number of the metallic members placed so as to be substantially always in contact with molten glass is at least one. It is preferred that the number of the metallic members be three or more, and it is more preferred that the number of the metallic members be six or more. For example, there is a case in which two or more temperature detectors are used to monitor temperature variation of molten glass at various places in the melting tank. In this case, the number of the metallic members used is according to the number of the temperature detectors.

In the glass manufacturing method and the glass melting furnace according to the first embodiment, every metallic member is placed so as to be substantially always outside the electric current flowing region which is formed by the one or more pairs of electrodes in molten glass held in the melting tank. "Being substantially always outside the current-carrying region" as used herein means, in batch production, being outside the electric current flowing region for a period which is 98% or more of the whole period in which the melting step is performed during the operating period, and, in continuous production, being outside the electric current flowing region for a period which is 98% or more of the whole operating period. "Electric current flowing region" as used herein substantially means a region in molten glass between a pair of the electrodes in which the current density is relatively high and discharge breakdown of metal is more likely to occur. Such a region varies depending on the arrangement of the electrodes and the shape and the size of the melting tank. A typical example of the electric current flowing region may be approximately thought to be a region in which a pair of the electrodes are immediately opposed to each other plus a region up to 60° upward and up to 30° sideways and downward from ends of the electrodes from the region. More specifically, when glass is mass-produced with block-like tin oxide electrodes being embedded so as to be substantially flush with the wall surfaces made of refractory material, respectively, at the start of mass production, the electrodes and portions of the wall surfaces in the vicinity thereof are eroded. The state of the erosion at the end of mass production is observed. There is a tendency that erosion of the wall surfaces made of refractory material in the region up to 60° upward and up to 30° sideways and downward from ends of the electrodes and outward from the outlines of the electrodes exposed after the erosion is considerable compared with erosion of the wall surfaces made of refractory material in the region outside the region. From this, the region in which erosion is relatively considerable is thought to correspond to a region in which the current density is relatively high in molten glass.

When every metallic member is placed so as to be substantially always outside the electric current flowing region which is formed by the one or more pairs of electrodes in molten glass held in the melting tank, at least one mode selected from the following may be adopted for each metallic member: (1) a mode in which it is movably placed so as to be substantially always outside the electric current flowing region (first mode of arrangement); and (2) a mode in which it is fixedly placed so as to be substantially always outside the electric current flowing region (second mode of arrangement). "Being substantially always outside the electric current flowing region" as used herein means, in batch production, being outside the electric current flowing region for a period which is 98% or more of the whole period in which the melting step is performed during the operating period, and, in continuous production, being outside the electric current flowing region for a period which is 98% or more of the whole operating period. Therefore, when the operation conditions are frequently changed (non-steady operation state), for example, when manufacturing conditions are set immediately after a start of mass production, or, when an instrument formed of or including a metallic member is replaced, temporary entrance of a metallic member into the electric current flowing region is permitted.

In the first mode of arrangement, specifically, temporary entrance into the electric current flowing region of a metallic member placed in the vicinity of an electrode and outside the electric current flowing region before a start of mass production caused by enlargement to the outside of the electric current flowing region beyond the wall surfaces before the start of mass production by erosion of portions of the wall surfaces in the vicinity of the electrode is sensed, and the metallic member is moved so as to be outside the electric current flowing region again. It is to be noted that whether a metallic member is in the electric current flowing region or not can be determined by, for example, the number of metal particles separated in the glass which is monitored over time, or the amount of electric current flowing through the metallic member which is monitored over time. When it is determined that metallic member temporarily enters the electric current flowing region, the metallic member can be moved to the outside of the electric current flowing region again by manually or mechanically moving the metallic member.

In the second mode of arrangement, specifically, the metallic members are, before a start of mass production of glass, fixedly placed so as to be outside the electric current flowing region even immediately before an end of mass production, taking into consideration possible enlargement to the outside of the electric current flowing region beyond the wall surfaces before a start of mass production by erosion of portions of the wall surfaces in the vicinity of the electrodes.

On the other hand, from the findings described above, it may be supposed that, aside from focusing attention on the electric current flowing region as in the glass manufacturing method according to the first embodiment, to focus attention on the difference in the amount of erosion of the wall surfaces of the melting tank and to place the metallic members at positions at which corrosion due to electric discharge is not caused is also effective. This is because, at places at which the amount of erosion of the wall surfaces is relatively large, in addition to erosive power of molten glass itself, effect of promoting erosion due to electric current flowing through molten glass in the vicinity of the electrodes is contributory, and thus, corrosion due to electric discharge is more likely to be caused.

Here, a glass manufacturing method according to a second embodiment is, similarly to the first embodiment, a method for mass-producing glass with a glass melting furnace, the glass melting furnace comprising: a melting tank, at least a wall surface in contact with molten glass thereof being made of refractory material; at least one pair of electrodes placed so as to be in contact with the molten glass held in the melting tank for ohmically heating the molten glass held in the melting tank; and at least one metallic member, at least a surface thereof being made of metal and the surface being placed so as to be substantially always in contact with the molten glass held in the melting tank, wherein: the wall surface is eroded as cumulative contact time between the molten glass and the wall surface increases to form two kinds of erosion surfaces, including a low erosion region which is away from the at least one pair of electrodes and in which an amount of erosion of the wall surface is relatively small; and a high erosion region which is in a vicinity of the at least one pair of electrodes and in which the amount of erosion of the wall surface is relatively large, and wherein: every one of the at least one metallic member is fixedly placed in advance before a start of mass production of the glass so as to be substantially flush with a wall surface which may be in the low erosion region at an end of the mass production of the glass. Further, a glass melting furnace according to the second embodiment is a glass melting furnace which uses the glass manufacturing method according to the second embodiment described above.

"Low erosion region" as used herein means a region in which the amount of erosion and variations in the amount of erosion in the region are smaller than those with regard to the high erosion region and in which the wall surfaces before a start of erosion and erosion surfaces at the end of mass production of glass are substantially parallel with each other at any place therein. "High erosion region" as used herein means a region in which the amount of erosion and variations in the amount of erosion in the region are larger than those with regard to the low erosion region and in which there is a region where the wall surfaces before a start of erosion and erosion surfaces at the end of mass production of glass are substantially nonparallel with each other therein.

It is to be noted that, in the glass manufacturing method and the glass melting furnace according to the second embodiment, a prediction is made before a start of mass production of glass as to which portion of the wall surfaces is to be the "low erosion region", and the metallic members are placed therein. On the other hand, as described above, it is empirically known that erosion of the wall surfaces made of refractory material in the region up to 60° upward and up to 30° sideways and downward from ends of the electrodes and outward from the outlines of the electrodes exposed after the erosion at the end of mass production is considerable compared with erosion of the wall surfaces made of refractory material in the region outside the region. Such difference in the state of erosion is expected to vary depending on the composition and the melting temperature of the glass, and the like. However, if the composition of the glass used in the glass manufacturing method according to this embodiment is soda-lime glass, alumino-silicate glass, or alkali-free glass which are suitable for mass production, because all of them are metal oxides a main component of which is silica and because their melting temperatures do not differ much, it is clear that, no matter which composition of glass is selected, there is no significant difference in the erosive power. Therefore, a prediction may be made as to which portion of the wall surfaces is to be the "low erosion region" and the metallic members may be placed at appropriate positions without fail. Even when variations in the amount of erosion to some extent are taken into consideration, it is preferred that the metallic members be placed, at a point in time immediately before a start of mass production of glass, outside a region up to 60° upward and up to 30° sideways and downward from ends of electrode surfaces formed when erosion of electrode surfaces is assumed to progress up to 2 cm from outer surfaces of the refractory in which the electrodes are placed (outer wall surfaces of the melting tank) (imaginary electrode surfaces). It is more preferred that the metallic members be placed outside a region up to 45° sideways and downward and not be placed on an upward side. It is to be noted that the imaginary electrode surfaces are set at the positions described above taking into consideration the depth of erosion of the electrode surfaces on average after an end of mass production of the above-mentioned glass the composition of which is suitable for mass production.

"Being substantially flush with the wall surfaces" as used herein specifically means that, when metallic members are placed, the amount of protrusion or the amount of depression of the metallic members with respect to the wall surfaces before a start of erosion is ±10% or less of the distance between electrodes in a pair. It is to be noted that the amount of protrusion or the amount of depression when the metallic members are placed described above is preferably ±8% or less of the distance between the electrodes across which electric current flows, more preferably ±5% or less, still preferably ±4% or less, yet preferably ±3% or less, further preferably ±2% or less, still further preferably ±1% or less, yet further preferably ±0.5% or less, and further preferably ±0.1% or less. By placing the metallic members in the range described above with respect to the wall surfaces before a start of erosion, functions of instruments formed only of metallic members (for example, a gas ejector) and of instruments including metallic members as part of the structural elements (for example, a temperature detector) are not prevented from being delivered. In addition, there is not a possibility that the metallic members protrude so much toward the center of the melting tank as to reach the electric current flowing region.

It is to be noted that, when the glass manufacturing method according to the first and second embodiments is put into practice, the temperature of molten glass held in the melting tank is appropriately selected according to the composition of the glass and the like, but the temperature is preferably 1200° C. or higher and more preferably 1300° C. or higher. In such a high temperature range, not only the erosive power of molten glass itself increases, but also the amount of electric current flowing across the electrodes increases, and hence the effect of promoting erosion due to electric current flowing thereacross increases. Therefore, conventionally, in mass production of glass, the amount of metal particles as foreign matters separated in the glass increases, and the point in the course of time at which the separation suddenly increases comes earlier. However, in the glass manufacturing method according to the first and second embodiments, because separation of metal particles as foreign matters in the glass is suppressed radically, more excellent effect of improvement can be obtained regarding the separation of metal particles as foreign matters. It is to be noted that the upper limit of the temperature of molten glass is not specifically limited, but is preferably 1700° C. or lower from a practical viewpoint such as securing the useful life of the melting furnace.

Further, the glass used in the glass manufacturing method according to the first and second embodiments is not specifically limited, and any glass having publicly known glass composition may be selected. In particular, it is preferred that mass-produced glass be used, for example, soda-lime glass used in a glass manufacturing line which uses a so-called float method, alumino-silicate glass represented by N5 and N5H manufactured by HOYA CORPORATION and GD7S manufactured by Nippon Sheet Glass Co., Ltd., and alkali-free glass represented by NA35 manufactured by AvanStrate Inc. and 7059 manufactured by Corning Incorporated.

Specific examples are described of the glass manufacturing method according to the first and second embodiments and the glass melting furnace used therein which are described above. FIG. 1 is an explanatory diagram for describing an exemplary glass manufacturing method according to this embodiment and a glass melting furnace used therein. More specifically, FIG. 1 shows a sectional view of a glass melting furnace immediately after a start of mass production having block-like electrodes embedded in side wall surfaces thereof taken along a plane in parallel with the liquid level of molten glass held in a melting tank. A glass melting furnace 1 shown in FIG. 1 comprises a melting tank 10 formed by a refractory 12 placed so as to form a box-like frame, block-like electrodes 20L, 20R, 22L, and 22R embedded in the refractory 12 so as to be flush with a left inner wall surface 14L and a right inner wall surface 14R which are inner wall surfaces in a longitudinal direction of the frame formed by the refractory 12, and temperature detectors 30U, 30C, and 30D embedded in the left inner wall surface 14L of the refractory 12 in a state of being fixed in advance in the refractory 12 such that only tip portions thereof are exposed. The melting tank 10 is filled with molten glass. When the melting tank 10 is used in a continuous production glass manufacturing apparatus, a side of an upstream inner wall surface 14U of the melting tank 10 is connected to a glass supply source (not shown), while a side of a downstream inner wall surface 14D of the melting tank 10 is connected to a molten glass discharge outlet (not shown). It is to be noted that, in the following description, the melting tank 10 is described on the assumption that the melting tank is used in a continuous production glass manufacturing apparatus.

It is to be noted that surfaces of the temperature detectors 30U, 30C, and 30D are formed of metallic members. The temperature detectors 30U, 30C, and 30D may include, for example, a cylindrical body formed of alumina with a metallic protective layer formed of Pt or Pt alloy, and a thermocouple placed in the cylindrical body. As illustrated by an arrow F in FIG. 1, molten glass flows in the melting tank 10 from the side of the upstream inner wall surface 14U to the side of the downstream inner wall surface 14D. In the melting tank 10, the side of the upstream inner wall surface 14U may be hereinafter referred to as "upstream side" or "upstream", the side of the downstream inner wall surface 14D may be hereinafter referred to as "downstream side" or "downstream", the side of the left inner wall surface 14L may be hereinafter referred to as "left side" or "left", and the side of the right inner wall surface 14R may be hereinafter referred to as "right side" or "right".

The block-like electrode 20L embedded in a portion of the refractory 12 placed on the left downstream side of the melting tank 10 and the block-like electrode 20R embedded in a portion of the refractory 12 placed on the right downstream side of the melting tank 10 so as to be opposed to the block-like electrode 20L are electrically in a pair. The block-like electrode 22L embedded in a portion of the refractory 12 placed on the left upstream side of the melting tank 10 and the block-like electrode 22R embedded in a portion of the refractory 12 placed on the right upstream side of the melting tank 10 so as to be opposed to the block-like electrode 22L are electrically in a pair. Therefore, in ohmic heating, as shown in FIG. 1, an electric current flowing region 40 is formed between the block-like electrodes 20L and 20R while an electric current flowing region 42 is formed between the block-like electrodes 22L and 22R. It is to be noted that the electric current flowing region 40 (42) extends, in addition to a region in which the pair of block-like electrodes 20L and 20R (22L and 22R) are immediately opposed to each other, from the region so as to further form an angle of 30° to the upstream side and to the downstream side from edges of the block-like electrodes 20L and 20R (22L and 22R).

The temperature detector 30U embedded in the refractory 12 such that a tip portion thereof is exposed on the left inner wall surface 14L is placed between the upstream inner wall surface 14U and the electric current flowing region 42 with respect to a flow direction F of molten glass. Similarly, the temperature detector 30C is placed between the electric current flowing region 40 and the electric current flowing region 42, and the temperature detector 30D is placed between the electric current flowing region 40 and the downstream inner wall surface 14D. In other words, all the tip portions of the temperature detectors 30U, 30C, and 30D are in contact with only molten glass positioned outside the electric current flowing regions 40 and 42. Therefore, the temperature detectors 30U, 30C, and 30D are kept outside the electric current flowing regions 40 and 42 not only immediately after a start of mass production of glass but also until immediately before an end of mass production. Therefore, even when glass is mass-produced for a long period of time, mixture of metal particles as foreign matters in the glass caused by corrosion due to electric discharge of the metallic members forming the temperature detectors 30U, 30C, and 30D can be suppressed. It is to be noted that, similarly, an instrument including a metallic member such as a temperature detector and an instrument formed only of a metallic member may be placed in the upstream inner wall surface 14U, the downstream inner wall surface 14D, the right inner wall surface 14R, or the bottom wall surface so as to be in contact with only molten glass positioned outside the electric current flowing regions 40 and 42.

Figure 2:
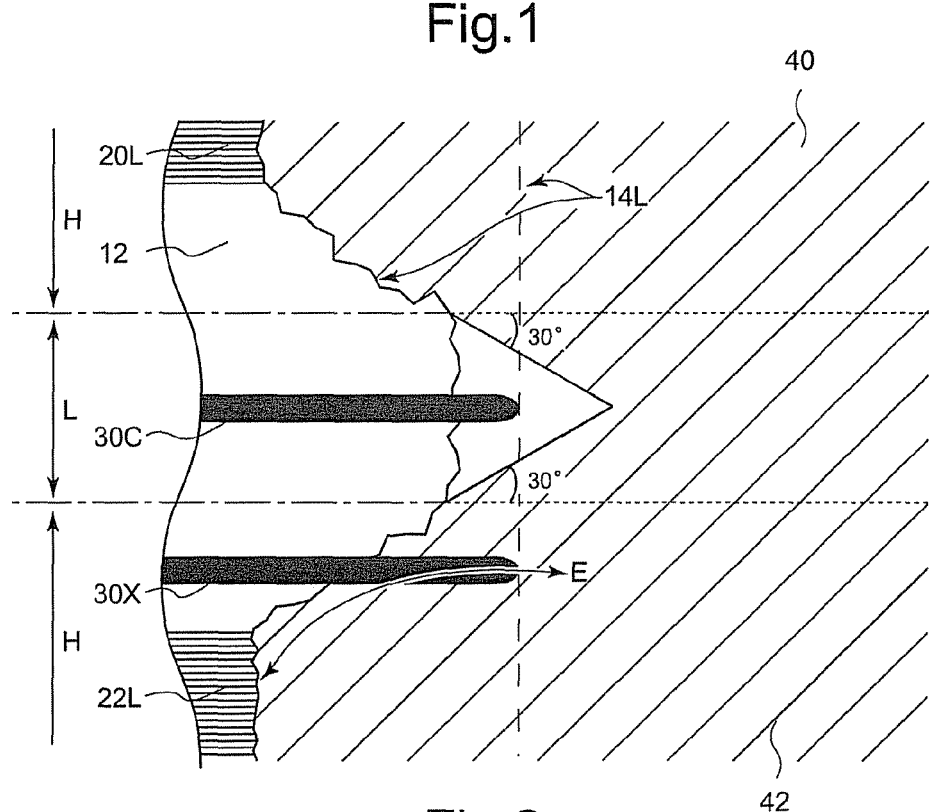
FIG. 2 shows an exemplary state of glass on a left inner wall surface in the vicinity of a temperature detector at the center illustrated in FIG. 1 immediately before an end of mass production.

FIG. 2 illustrates an exemplary state of the glass on the left inner wall surface 14L in the vicinity of the temperature detector 30C shown in FIG. 1 immediately before an end of mass production. In FIG. 2, same reference numerals are used for similar members shown in FIG. 1, and a broken line designated as 14L is the position of the left inner wall surface immediately after a start of mass production of the glass while a solid line designated as 14L is the position of the left inner wall surface immediately before an end of mass production of the glass. In FIG. 2, a temperature detector 30X has a similar structure to that of the temperature detector 30C and placed at an imaginary position. As shown in FIG. 2, in the state immediately before the end of mass production of the glass, erosion of the left inner wall surface 14L progresses compared with the state immediately after the start of mass production, and, in particular, erosion of a region corresponding to the electric current flowing regions 40 and 42 considerably progresses and the depth of erosion is at the maximum at the block-like electrodes 20L and 22L. With regard to the left inner wall surface 14L (solid line) in the vicinity of the block-like electrodes 20L and 22L, the depth of erosion increases as the distance to the block-like electrode 20L or 22L becomes shorter, and, at that portion, the left inner wall surface 14L (solid line) is nonparallel with the left inner wall surface 14L (broken line) immediately after the start of mass production. In other words, that portion and portions in which the block-like electrodes 20L and 22L are placed are in a high erosion region H. With regard to a portion of the left inner wall surface 14L (solid line) other than that portion, the amount of erosion is relatively small, and, at that portion, the left inner wall surface 14L (solid line) is substantially parallel with the left inner wall surface 14L (broken line) immediately after the start of mass production. In other words, that portion is in a low erosion region L.

By such erosion, although only the tip portion of the temperature detector 30C is in contact with molten glass immediately after the start of mass production, not only the tip portion but also a root side is brought into contact with molten glass to some extent immediately before the end of mass production. This causes the area of the temperature detector 30C in contact with molten glass immediately before the end of mass production to drastically increase compared with that immediately after the start of mass production. However, all the portion of the temperature detector 30C exposed to molten glass is positioned outside the electric current flowing regions 40 and 42, and the position at which the temperature detector 30C is placed is in the low erosion region L. Therefore, corrosion due to electric discharge of the temperature detector 30C is not caused.

It is to be noted that, as shown in FIG. 2, supposing that the temperature detector 30X is placed at a position which is nearer to the side of the electrode 22L and which is in the high erosion region H, although only the tip portion of the temperature detector 30X is in contact with molten glass immediately after the start of mass production, not only the tip portion but also the root side is brought into contact with molten glass to a large extent immediately before the end of mass production. In addition, all the portion of the temperature detector 30X exposed to molten glass is positioned in the electric current flowing region 42. Therefore, an electric current path through the electrode 22L, the temperature detector 30X, and the electrode 22R (not shown in FIG. 2) in the electric current flowing region 42 as illustrated by a double-headed arrow E is formed to cause corrosion due to electric discharge. However, if the temperature detector 30X is not fixed in the refractory 12 in advance and the temperature detector 30X can be moved to the left side so as not to reach the electric current flowing region 42 as the erosion of the left inner wall surface 14L progresses, such corrosion due to electric discharge can be prevented.

Figure 3:
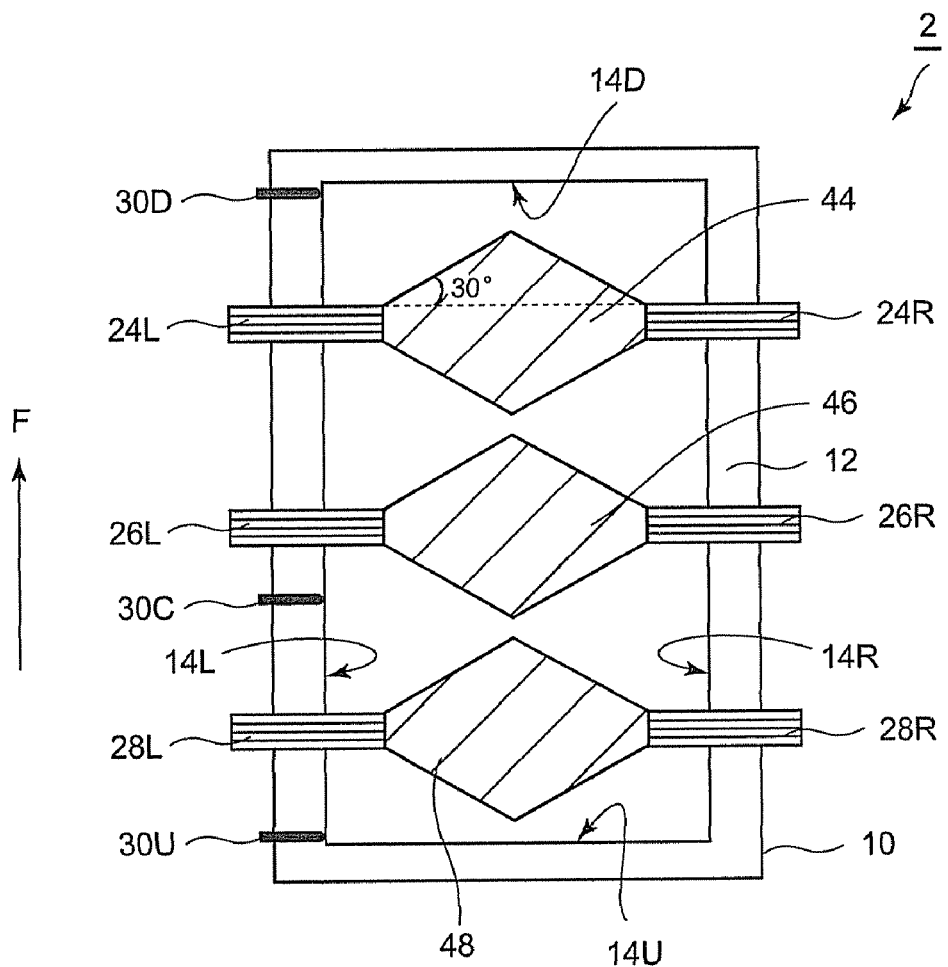
FIG. 3 is an explanatory diagram for explaining another exemplary glass manufacturing method of the embodiment and another exemplary glass melting furnace used therein.

Here will be described another mode of a melting furnace which may be used in the glass manufacturing method according to the first and second embodiments. FIG. 3 is an explanatory diagram for describing another exemplary glass manufacturing method according to this embodiment and a glass melting furnace used therein. More specifically, FIG. 3 shows a sectional view of a glass melting furnace immediately after a start of mass production having rod-like electrodes placed so as to pierce the side wall surfaces and so as to protrude into the melting tank taken along a plane in parallel with the liquid level of molten glass held in the melting tank. In FIG. 3, same reference numerals are used for members having similar functions and shapes to those shown in FIG. 1 and FIG. 2. A glass melting furnace 2 shown in FIG. 3 basically has a structure similar to that of the glass melting furnace 1 shown in FIG. 1, but is characterized by using three pairs of rod-like electrodes 24R, 24L, 26R, 26L, 28R, and 28L instead of the two pairs of block-like electrodes 20R, 20L, 22R, and 22L. In the melting furnace 2, the rod-like electrodes 24L, 26L, and 28L are placed so as to pierce the left inner wall surface 14L and so as to protrude into the melting tank 10, while the rod-like electrodes 24R, 26R, and 28R are placed so as to pierce the right inner wall surface 14R and so as to protrude into the melting tank 10. The rod-like electrodes 24R and 24L are in a pair so as to form an electric current flowing region 44, the rod-like electrodes 26R and 26L are in a pair so as to form an electric current flowing region 46, and the rod-like electrodes 28R and 28L are in a pair so as to form an electric current flowing region 48. With respect to the flow direction F of molten glass, the rod-like electrodes 24R and 24L are placed on a downstream side, the rod-like electrodes 28R and 28L are placed on an upstream side, and the rod-like electrodes 26R and 26L are placed at a position between the rod-like electrodes 24R and 24L and the rod-like electrodes 28R and 28L.

The temperature detector 30U placed so as to be embedded in the refractory 12 such that a tip portion thereof is exposed on the left inner wall surface 14L is placed between the upstream inner wall surface 14U and the electric current flowing region 48 with respect to the flow direction F of molten glass. Similarly, the temperature detector 30C is placed at a position between the electric current flowing region 46 and the electric current flowing region 48 and on the side of the rod-like electrode 26L. Alternatively, the temperature detector 30C may be placed at a position between the electric current flowing region 44 and the electric current flowing region 46 and on the side of the rod-like electrode 26L. The temperature detector 30D is placed between the electric current flowing region 44 and the downstream inner wall surface 14D.

Figure 4:
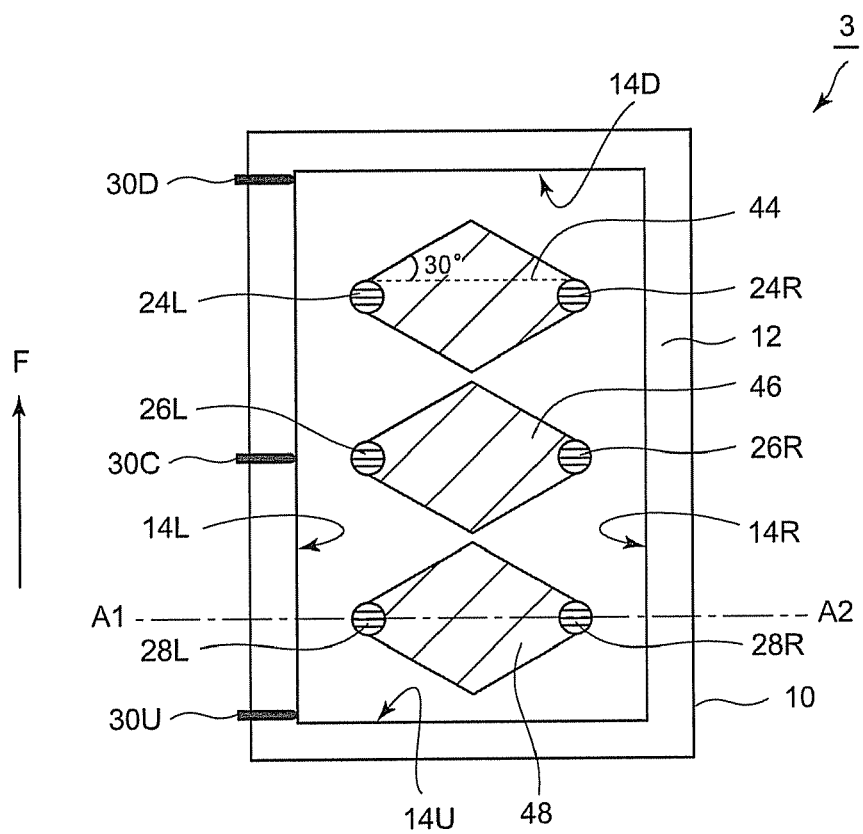
FIG. 4 is an explanatory diagram for explaining another exemplary glass manufacturing method of the embodiment and another exemplary glass melting furnace used therein.

FIG. 4 is an explanatory diagram for explaining still another exemplary glass manufacturing method according to the first and second embodiments and a glass melting furnace used therein. More specifically, FIG. 4 shows a sectional view of a glass melting furnace immediately after a start of mass production having rod-like electrodes placed so as to pierce the bottom wall surfaces and so as to protrude into the melting tank taken along a plane in parallel with the liquid level of molten glass held in the melting tank. In FIG. 4, same reference numerals are used for members having similar functions and shapes to those shown in FIG. 3. A glass melting furnace 3 shown in FIG. 4 basically has a structure similar to that of the glass melting furnace 2 shown in FIG. 3, but is characterized by the three pairs of rod-like electrodes 24R, 24L, 26R, 26L, 28R, and 28L being placed so as to pierce the bottom wall surface and so as to protrude into the melting tank 10 instead of piercing the left inner wall surface 14L and the right inner wall surface 14R to protrude into the melting tank 10. The rod-like electrodes 24R, 26R, and 28R are placed at a position in the melting tank 10 on the side of the right inner wall surface 14R, while the rod-like electrodes 24L, 26L, and 28L are placed at a position in the melting tank 10 on the side of the left inner wall surface 14L. The temperature detector 30U placed so as to be embedded in the refractory 12 such that a tip portion thereof is exposed on the left inner wall surface 14L is placed near the upstream inner wall surface 14U with respect to the flow direction F of molten glass. The temperature detector 30D is placed near the downstream inner wall surface 14D with respect to the flow direction F of molten glass. The temperature detector 30C is placed at a midpoint between the position at which the temperature detector 30U is placed and the position at which the temperature detector 30D is place. More specifically, the temperature detector 30C is positioned on a side opposite to a side on which the rod-like electrode 26R is placed with respect to the rod-like electrode 26L.

Figure 5:
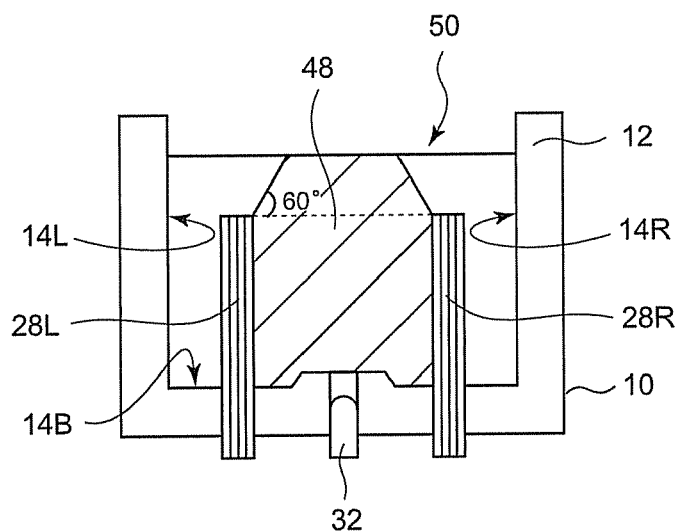
FIG. 5 shows a sectional view of the melting furnace taken along the line A1-A2 in FIG. 4.

FIG. 5 shows a sectional view of the melting furnace 3 taken along the line A1-A2 of FIG. 4. In FIG. 5, same reference numerals are used for members having similar functions and shapes to those shown in FIG. 4. As shown in FIG. 5, the rod-like electrodes 28L and 28R are placed such that top portions thereof are lower than a liquid level 50 of molten glass. A gas ejector 32 formed of Pt or Pt alloy is placed in a portion at the center of a bottom wall surface 14B which is partly bulged such that a tip portion thereof is buried in that portion. Therefore, although a region of the bottom wall surface 14B which is bordered by the rod-like electrode 28L and the rod-like electrode 28R is in contact with the electric current flowing region 48, the gas ejector 32 is placed at a position which is sufficiently away from the electric current flowing region 48. In addition, even if erosion of the partly bulged portion at the center of the bottom wall surface 14B progresses, the gas ejector 32 remains outside the electric current flowing region 48 for a long period of time. Therefore, protrusion of the gas ejector 32 into the electric current flowing region 48 can be suppressed.

Specific processes in the glass manufacturing method according to the first and second embodiments are not limited insofar as, as shown in FIGS. 1 to 5, glass is manufactured using ohmic heating and using a melting furnace having metallic members placed at predetermined positions thereof. However, normally, it is preferred that glass be manufactured through at least a melting step of melting glass material, a fining step of fining molten glass, and a shaping step of shaping the molten glass through at least the fining step into a predetermined shape. Further, as necessary, a step of adjusting the viscosity of fined molten glass to a predetermined value, a step of further homogenizing fined molten glass, or the like may be additionally provided after the fining step and before the shaping step. It is to be noted that the plurality of steps including the melting step and the shaping step may be performed in batch production using one melting tank, but it is preferred that melting tanks corresponding to the respective steps be connected in series to perform the steps in continuous production.

When glass is mass-produced in continuous production, the steps prior to the shaping step may be performed in respective plurality of zones formed by dividing a long melting furnace along the flow direction of molten glass, but, normally, it is preferred that melting furnaces be provided for the respective steps. For example, when glass is manufactured through the melting step, the fining step, a homogenizing step of further homogenizing fined molten glass, and the shaping step in this order, three melting furnaces (a material melting furnace, a fining furnace, and a homogenizing furnace (also referred to as operation furnace)) may be provided so as to correspond to the melting step, the fining step, and the homogenizing step, respectively, and to be connected in series. When a plurality of melting furnaces are used in this way, at least one of the melting furnaces is an ohmic heating melting furnace using at least ohmic heating. All the ohmic heating melting furnaces for use are the glass melting furnace according to the first embodiment or the glass melting furnace according to the second embodiment. For example, when the material melting furnace heats glass material or molten glass only by flame heating, the fining furnace heats molten glass by flame heating and ohmic heating, and the homogenizing furnace heats molten glass only by ohmic heating, the glass melting furnaces according to this embodiment are used as the fining furnace and the homogenizing furnace.

It is to be noted that, in the shaping step, a publicly known method may be appropriately selected according to the shape of the glass to be manufactured. For example, when a substantially disk-like glass suitable for being postprocessed into a substrate for an information recording medium, an optical lens, or the like is manufactured, a direct press method may be used in which a soft glass gob obtained by cutting into predetermined amount of pieces molten glass supplied from the melting furnace is pressed by an upper mold and a lower mold. When a large-area plate-like glass suitable for being postprocessed into a substrate for a display or the like is manufactured, a fusion method in which molten glass overflowed from an upper end side of a fusion pipe is formed so as to be plate-like while being vertically pulled down and annealed, a down draw method in which molten glass is formed so as to be plate-like while being vertically pulled down from a slit-like nozzle provided at the bottom of the melting tank and annealed, a float method in which molten glass supplied from the melting furnace is stretched while floating on molten tin filling a float bath and is shaped so as to be plate-like, and then is annealed, or the like may be used. It is to be noted that, when the float method is used, it is also preferred to manufacture a substrate for an information recording medium by cutting a disk-like glass out of an obtained large-sized plate-like glass and carrying out postprocessing such as polishing.

The glass manufacturing apparatus according to this embodiment comprises at least one glass melting furnace according to this embodiment. For example, when the shaping step using the direct press method is performed in addition to the above-mentioned melting step, fining step, and homogenizing step to manufacture glass, the structure may be as described below. In this case, the glass manufacturing apparatus comprises a material melting furnace for heating glass material and molten glass by flame heating, a fining furnace connected to a side of a molten glass discharge outlet of the material melting furnace for heating molten glass by flame heating and ohmic heating, a homogenizing furnace connected to a side of a molten glass discharge outlet of the fining furnace for heating molten glass by ohmic heating, and shaping means for shaping by pressing with an upper mold and a lower mold a soft glass gob obtained by cutting into predetermined amount of pieces molten glass supplied from a side of a molten glass discharge outlet of the homogenizing furnace. As the fining furnace and the homogenizing furnace, the glass melting furnaces according to this embodiment are used.

Figure 6:
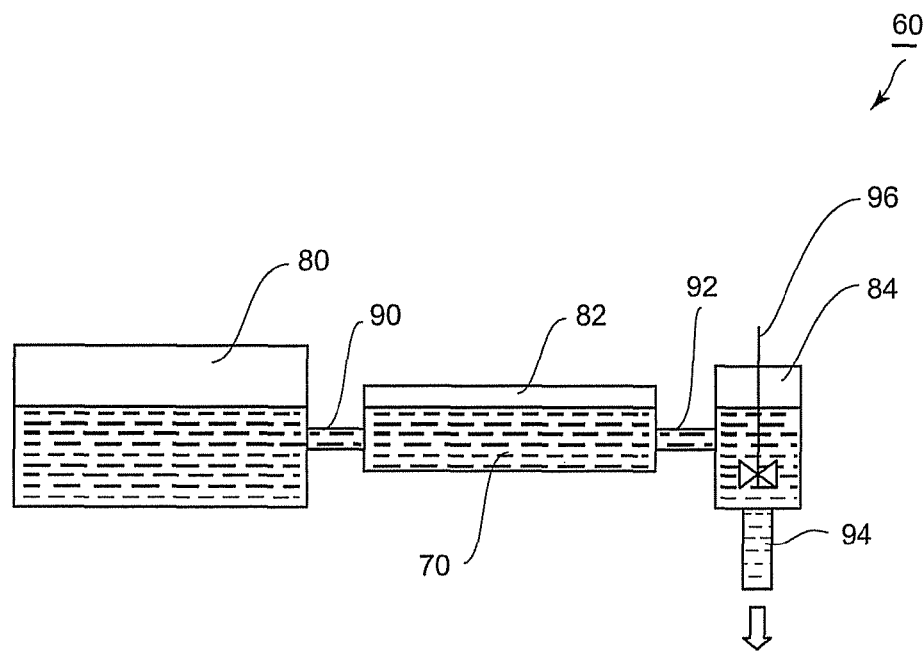
FIG. 6 shows a schematic view of an exemplary glass manufacturing apparatus of the embodiment.

Here will be explained a specific example of the glass manufacturing apparatus according to this embodiment. FIG. 6 shows a schematic view of an exemplary glass manufacturing apparatus according to this embodiment. With reference to FIG. 6, in a glass manufacturing apparatus 60, a melting furnace 80, a fining furnace 82, and an operation furnace (homogenizing furnace) 84 are placed in this order from an upstream side to a downstream side with respect to the flow direction of molten glass 70. A side wall surface of the melting furnace 80 is connected to a side wall surface of the fining furnace 82 through a connecting pipe 90. A side wall surface of the fining furnace 82 is connected to a side wall surface of the operation furnace 84 through a connecting pipe 92, and a bottom wall surface of the operation furnace 84 is connected to a discharge pipe 94. Agitating means 96 is placed in the operation furnace 84. It is to be noted that each of the melting furnaces 80, 82, and 84 is shown as a melting tank portion which is a main portion thereof, and heating means such as electrodes used for ohmic heating, metallic members, and the like are omitted. In the glass manufacturing apparatus 60, at least one of the three melting furnaces 80, 82, and 84 is a melting furnace according to this embodiment.

When glass is mass-produced by the glass manufacturing apparatus 60, the melting tanks forming main portions of the melting furnaces 80, 82, and 84, respectively, are filled with the molten glass 70. Glass material is supplied to the melting furnace 80 from glass material supply means (not shown) placed in the vicinity of the melting furnace 80. The glass material is heated and molten in the melting furnace 80. The molten glass 70 in the melting furnace 80 is moved through the connecting pipe 90 to the fining furnace 82 by an amount according to the supply of the glass material. In the fining furnace 82, the molten glass 70 is fined. The molten glass 70 after being fined is moved through the connecting pipe 92 to the operation furnace 84. In the operation furnace 84, the molten glass 70 is agitated by the agitating means 96 so as to be homogenized. After that, the homogenized molten glass 70 is transferred from the operation furnace 84 through the discharge pipe 94 to a forming apparatus or the like for performing a downstream process.

Figure 7:
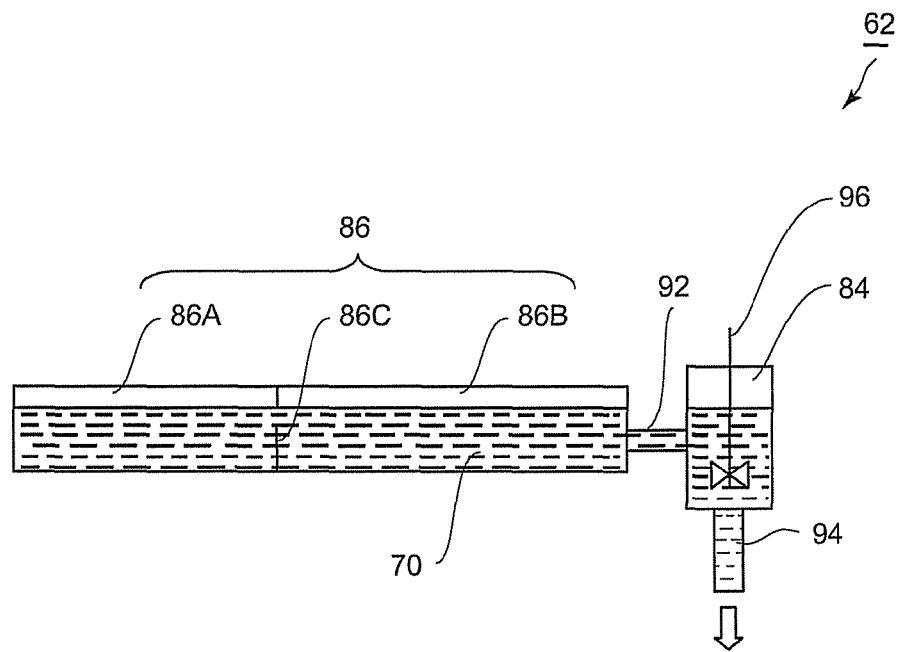
FIG. 7 shows a schematic view of another exemplary glass manufacturing apparatus of the embodiment.

FIG. 7 shows a schematic view of another exemplary glass manufacturing apparatus according to this embodiment. In FIG. 7, same reference numerals are used for members having similar functions and structures to those shown in FIG. 6. A glass manufacturing apparatus 62 shown in FIG. 7 has a structure similar to that of the glass manufacturing apparatus 60 except that the melting furnace 80 and the fining furnace 82 of the glass manufacturing apparatus 60 shown in FIG. 6 are integrally structured. More specifically, in the glass manufacturing apparatus 62, one melting furnace 86 is divided into a melting portion 86A which functions as a melting furnace and a fining portion 86B which functions as a fining furnace by a partitioning member 86C provided therein. An opening is provided in the partitioning member 86C, thereby enabling the molten glass 70 in the melting portion 86A to move into the fining portion 86B. A side wall surface of the fining portion 86B which is opposite to a side on which the partitioning member 86C is provided has a connecting pipe 92 for connecting the fining portion 86B to the operation furnace 84.

[Glass Blank Manufacturing Method]

As described above, by using the glass manufacturing method according to this embodiment, a so-called glass blank, which is a glass intermediate, can be manufactured. Here, the manufactured glass blank may be used in manufacturing various kinds of glass members including a substrate for an information recording medium used in manufacturing various kinds of information recording media such as a magnetic recording medium and an optical recording medium, a substrate for a display used in manufacturing a cover glass or the like of a liquid crystal display, an organic EL display, a small display provided on a cellular phone, or the like, an optical component such as a lens, a substrate for a touch panel, and a substrate for a solar cell. It is to be noted that the shape of the glass blank which depends on the application of the end product can be obtained by selecting a method in the shaping step which is appropriate for manufacturing glass in a predetermined shape such as the direct press method and the fusion method.

The glass blank for a substrate for an information recording medium may be a disk having a typical size of a diameter of about 2-10 cm and a thickness of about 0.5-1.1 mm. For example, in the case of a glass blank for a 2.5-inch substrate, the diameter may be about 65-70 mm and the thickness may be about 0.6-1.1 mm. It is to be noted that a glass blank for an information recording medium may be partly thick at a center portion or a peripheral portion. A glass blank for manufacturing an optical component may have a disk-like shape having a diameter of about 1-15 cm and a thickness of about 5-30 mm. A glass blank for a display may be formed by cutting a plate-like glass formed in the shaping step into a predetermined size so as to conform to specifications required by a display manufacturer. For example, the size of an 8th-generation glass substrate for TFT liquid crystal display is 2,200 mm×2,500 mm. There will be described methods of manufacturing various kinds of glass products using a glass blank obtained by the glass blank manufacturing method according to this embodiment.

[Method of Manufacturing Substrate for Information Recording Medium and Method of Manufacturing Information Recording Medium]

According to a method of manufacturing a substrate for an information recording medium of this embodiment, the substrate for an information recording medium is manufactured through at least a grinding/polishing step of grinding and/or polishing a main surface of a glass blank manufactured according to the glass blank manufacturing method of this embodiment. According to a method of manufacturing an information recording medium of this embodiment, the information recording medium is manufactured through at least an information recording layer forming step of forming an information recording layer on a main surface of a substrate for the information recording medium manufactured according to the method of manufacturing a substrate for an information recording medium of this embodiment.

Here will be explained the methods of manufacturing a substrate for an information recording medium and of manufacturing an information recording medium more specifically in the following. The substrate for an information recording medium may be manufactured by performing, for example, (1) a first lapping step, (2) a coring step, (3) an end face processing step, (4) a second lapping step, (5) a main surface polishing step, (6) a chemically strengthening step, and (7) a precisely cleaning step in this order with regard to a disk-like glass blank. It is to be noted that the order of the steps may be changed appropriately and some of the steps may be omitted. The steps are described more specifically in the following. It is to be noted that a substrate for an information recording medium may be manufactured also by press shaping a disk-like glass having a diameter which is sufficiently larger than the diameter of the substrate, taking a concentric-disk-like glass out of the disk-like glass by scribing, and performing the above-mentioned steps (1)-(7) with regard to the taken out disk-like glass.

(1) First Lapping Step

In the first lapping step, by lapping both main surfaces of the glass blank, a disk-like rough glass plate is obtained. The lapping may be performed by a double-sided lapping machine with a planetary gear mechanism using alumina-based free abrasive grains.

(2) Coring Step

Then, a cylinder-like diamond drill is used to form a circular hole at the center of the glass substrate to obtain a doughnut-like glass substrate (coring).

(3) End Face Processing Step

Then, with regard to an inner peripheral end face and an outer peripheral end face, predetermined beveling and polishing are performed using a diamond grindstone, a polishing brush, or the like.

(4) Second Lapping Step

Next, with regard to the both main surfaces of the obtained glass substrate, a second lapping step is performed similarly to the first lapping step. By performing the second lapping step, minute irregularities formed on the main surfaces at the end face processing step can be removed in advance, which enables completion of the subsequent main surface polishing step in a short time.

(5) Main Surface Polishing Step

As a former half step of the main surface polishing step, first, a first polishing step is performed. The main purpose of the first polishing step is to remove flaws and distortion which remain in the main surfaces and which are caused by the lapping steps described above. In the first polishing step, by a double-sided polishing machine having a planetary gear mechanism, the main surfaces are polished using a rigid resin polisher. As the polishing solution, for example, cerium oxide abrasive grains may be used. The glass substrate after the first polishing step is soaked in a neutral detergent cleaning tank, a pure water cleaning tank, and an isopropyl alcohol (IPA) cleaning tank in this order to be cleaned.

Then, as a latter half step of the main surface polishing step, a second polishing step is performed. The purpose of the second polishing step is to mirror finish the main surfaces. In the second polishing step, by a double-sided polishing machine having a planetary gear mechanism, the main surfaces are mirror polished using a flexible foam resin polisher. As the polishing solution, cerium oxide abrasive grains which are smaller than the cerium oxide abrasive grains used in the first polishing step may be used. The glass substrate after the second polishing step is soaked in a neutral detergent cleaning tank, a pure water cleaning tank, and an isopropyl alcohol (IPA) cleaning tank in this order to be cleaned. It is to be noted that ultrasound is applied to each cleaning tank.

(6) Chemically Strengthening Step

When a glass blank used in manufacturing a substrate for an information recording medium is formed of glass containing an alkali metal such as lithium and sodium, it is preferred that chemical strengthening be performed on the glass substrate. By performing the chemically strengthening step, high compressive stress can be generated in surface portions of the substrate for an information recording medium. Therefore, the shock resistance of the surfaces of the substrate for an information recording medium can be improved. Such chemical strengthening treatment is very preferred in manufacturing a magnetic recording medium, which has a possibility that a head for recording and reproducing information is mechanically brought into contact with an information recording medium surface.

In the chemical strengthening, a chemically strengthening solution is prepared by mixing potassium nitrate and sodium nitrate. The chemically strengthening solution is heated while the glass substrate after being cleaned is preheated. The chemical strengthening is performed by soaking the glass substrate in the chemically strengthening solution. By soaking the glass substrate in the chemically strengthening solution in this way, lithium ions and sodium ions at the surfaces of the glass substrate are replaced by sodium ions and potassium ions, respectively, in the chemically strengthening solution, thereby strengthening the glass substrate.

(7) Precisely Cleaning Step

After that, in order to remove residues of the polishing agent and foreign iron-based contaminants and to further smoothen and clean the surfaces of the glass substrate, it is preferred to perform the precisely cleaning step.

The surface roughness of the information recording medium manufactured through the above-mentioned series of steps can be of the order of subnanometers in Ra. It is to be noted that the surface roughness can be appropriately adjusted by selecting the conditions of polishing and cleaning the main surfaces. It is to be noted that the substrate for an information recording medium obtained through the above-mentioned steps may be used in manufacturing an information recording medium which adopts various kinds of publicly known recording system including publicly known magnetic recording, optical recording, and magneto-optical recording, but it is preferred to use the substrate especially in manufacturing a magnetic recording medium.

By performing at least an information recording layer forming step of forming an information recording layer on the main surfaces of the substrate for an information recording medium obtained in this way, an information recording medium can be manufactured. It is to be noted that, when a magnetic recording medium is manufactured, a magnetic recording layer is provided as an information recording layer. The magnetic recording medium may be for longitudinal magnetic recording or may be for perpendicular magnetic recording, but it is preferred that the magnetic recording medium is for perpendicular magnetic recording. When a magnetic recording medium for perpendicular magnetic recording is manufactured, for example, an adhesion layer, a soft magnetic layer, an underlayer, a perpendicular magnetic recording layer, a protective layer, and a lubrication layer may be formed in this order on the both surfaces of the substrate for an information recording medium. It is to be noted that the adhesion layer, the soft magnetic layer, the underlayer, and the perpendicular magnetic recording layer may be formed by sputtering, the protective layer may be formed by sputtering or chemical vapor deposition (CVD), and the lubrication layer may be formed by dip coating.

[Method of Manufacturing Substrate for Display]

In a method of manufacturing a substrate for a display according to this embodiment, a glass blank is used to manufacture a display. More specifically, a glass blank is cut into a predetermined shape according to the size of the display, and cleaning and beveling of end faces are performed. After that, as necessary, for example, when the display is a cover glass used in a display portion of a cellular phone, chemical strengthening treatment may be performed, and, in the case of a substrate for a liquid crystal display, an indium tin oxide (ITO) film or the like may be formed.

[Method of Manufacturing Optical Component]

In a method of manufacturing an optical component according to this embodiment, an optical component is manufactured through at least a grinding/polishing step of grinding and/or polishing the main surfaces of a glass blank. More specifically, an optical component may be obtained by heating and softening a glass blank, press shaping the glass blank, annealing the obtained shaped object, and then performing grinding and/or polishing. Alternatively, the optical component may be obtained by precisely press shaping a glass blank and, as necessary, grinding an optically nonfunctioning surface (for example, centering of a lens). Alternatively, the optical component may be obtained by press shaping fined and homogenized molten glass, annealing the obtained shaped object, and then performing grinding and polishing. Those optical components may be used as optical components composing an imaging optical system such as a digital still camera, a digital video camera, a surveillance camera, or a vehicle-mounted camera, or composing a projection optical system such as a projector.

What is claimed is:

1. A glass manufacturing method for mass-producing glass with a glass melting furnace, said glass melting furnace comprising:
a melting tank, at least a wall surface in contact with molten glass thereof being made of refractory material;
at least one pair of electrodes placed so as to be in contact with said molten glass held in said melting tank for ohmically heating said molten glass held in said melting tank; and
at least one metallic member, at least a surface of which is made of metal and placed so as to be substantially always in contact with said molten glass held in said melting tank;
wherein:
every one of said at least one metallic member is, when said melting tank is filled with said molten glass, placed so as to be substantially always outside an electric current flowing region which is formed by said at least one pair of electrodes into said molten glass held in said melting tank; and
the electric current flowing region comprises:
a first region in which a pair of the electrodes are immediately opposed to each other; and
a second region up to 60 degrees upward and up to 30 degrees sideways and downward from the end of the electrodes from the first region.

2. The glass manufacturing method according to claim 1, wherein: each of said at least one metallic member is placed in a mode selected from the group consisting of: a mode in which it is movably placed so as to be substantially always outside said electric current flowing region; and a mode in which it is fixedly placed so as to be substantially always outside said electric current flowing region.

3. The glass manufacturing method according to claim 1, wherein said mass-producing of glass is carried by alternately repeating a melting step of charging glass material in said melting tank and melting the glass material and a discharge step of discharging from said melting tank the molten glass prepared by melting the glass material through said melting step.

4. The glass manufacturing method according claim 1, wherein:
said melting tank is connected to a glass supply source that is one of a molten glass flow inlet through which the molten glass substantially continuously flows in said melting tank and a glass material charge inlet through which glass material is charged substantially continuously, and to a molten glass discharge outlet through which the molten glass is continuously discharged; and wherein:
said mass producing of glass is carried by substantially continuously discharging, according to one of an inflow of the molten glass which flows through said molten glass flow inlet into said melting tank substantially continuously and an input of the glass material charged through said glass material charge inlet into said melting tank substantially continuously, the molten glass from said melting tank which is always filled with the molten glass.

5. The glass manufacturing method according to claim 1, wherein: said metal is at least one metal selected from the group consisting of platinum, platinum alloy, and strengthened platinum.

6. The glass manufacturing method according to claim 1, wherein: said at least one metallic member comprises at least one instrument selected from the group consisting of (1) a protective member of a temperature detector, the temperature detector including a temperature sensor and the protective member which covers said temperature sensor and at least a surface of which is made of metal, (2) an agitator which is used for agitating said molten glass and at least a surface of which is made of metal, (3) a pipe which is used for making said molten glass flow therethrough and at least a surface of which is made of metal, and (4) a gas ejector which is used for bubbling the molten glass and at least a surface of which is made of metal.

7. A glass manufacturing method for mass-producing glass with a glass melting furnace,
said glass melting furnace comprising:
a melting tank, at least a wall surface in contact with molten glass thereof being made of refractory material;
at least one pair of electrodes placed so as to be in contact with said molten glass held in said melting tank for ohmically heating said molten glass held in said melting tank; and
at least one metallic member, at least a surface of which is made of metal and placed so as to be substantially always in contact with said molten glass held in said melting tank, wherein:
said wall surface is eroded as cumulative contact time between said molten glass and said wall surface increases to form two kinds of erosion surfaces, one of which is a low erosion region being away from said at least one pair of electrodes and having a relatively small amount of erosion of said wall surface and another of which is a high erosion region being in a vicinity of said at least one pair of electrodes and having a relatively large amount of erosion of said wall surface, and wherein:
every one of said at least one metallic member is fixedly placed in advance before a start of mass producing of glass so as to be substantially flush with a wall surface which may be in said low erosion region at an end of said mass producing of glass; and
every one of said at least one metallic member is, when said melting tank is filled with said molten glass, placed so as to be substantially always outside an electric current flowing region which is formed by said at least one pair of electrodes into said molten glass held in said melting tank; and
the electric current flowing region comprises:
a first region in which a pair of the electrodes are immediately opposed to each other; and
a second region up to 60 degrees upward and up to 30 degrees sideways and downward from the end of the electrodes from the first region.

8. The glass manufacturing method according to claim 7, wherein: said mass-producing of glass is carried by alternately repeating a melting step of charging glass material in said melting tank and melting the glass material and a discharge step of discharging from said melting tank the molten glass prepared by melting the glass material through said melting step.

9. The glass manufacturing method according to claim 7, wherein: said melting tank is connected to a glass supply source that is one of a molten glass flow inlet through which the molten glass substantially continuously flows in said melting tank and a glass material charge inlet through which glass material is charged substantially continuously, and to a molten glass discharge outlet through which the molten glass is continuously discharged; and wherein: said mass producing of glass is carried by substantially continuously discharging, according to one of an inflow of the molten glass which flows through said molten glass flow inlet into said melting tank substantially continuously and an input of the glass material charged through said glass material charge inlet into said melting tank substantially continuously, the molten glass from said melting tank which is always filled with the molten glass.

10. The glass manufacturing method according to claim 7, wherein: said metal is at least one metal selected from the group consisting of platinum, platinum alloy, and strengthened platinum.

11. The glass manufacturing method according to claim 7, wherein: said at least one metallic member comprises at least one instrument selected from the group consisting of (1) a protective member of a temperature detector, the temperature detector including a temperature sensor and the protective member which covers said temperature sensor and at least a surface of which is made of metal, (2) an agitator which is used for agitating said molten glass and at least a surface of which is made of metal, (3) a pipe which is used for making said molten glass flow therethrough and at least a surface of which is made of metal, and (4) a gas ejector which is used for bubbling the molten glass and at least a surface of which is made of metal.

12. A glass manufacturing method for mass-producing glass with a glass melting furnace by;
   filling a melting tank of said glass melting furnace with molten glass;
   ohmically heating said molten glass held in said melting tank by means of at least one pair of electrodes placed so as to be in contact with said molten glass; and
   placing at least one metallic member, of which at least a surface is made of metal, to contact with said molten glass; wherein
   every one of said at least one metallic member is placed outside an effective electric current flowing region formed by said at least one pair of electrodes into said molten glass; and
   the electric current flowing region comprises:
      a first region in which a pair of the electrodes are immediately opposed to each other; and
      a second region up to 60 degrees upward and up to 30 degrees sideways and downward from the end of the electrodes from the first region.

13. The glass manufacturing method according to claim 12, wherein said effective electric current flowing region comprises an opposing region in which each pair of said electrodes are immediately opposed to each other plus a peripheral region up to 60° upward and up to 30° sideways and downward from ends of said electrodes from said opposing region.

14. The glass manufacturing method according to claim 12, wherein each of said at least one metallic member is placed movably or fixedly outside said effective electric current flowing region at least in said ohmically heating.

15. The glass manufacturing method according to claim 12, wherein
   said mass-producing of glass is carried by alternately repeating:
   a melting step of charging glass material in said melting tank and melting said glass material through said filing and said ohmically heating; and
   a discharge step of discharging from said melting tank the molten glass prepared by melting the glass material through said melting step.

16. The glass manufacturing method according to claim 12, wherein
   said mass-producing of glass is carried by:
   supplying molten glass or glass material continuously to said melting tank to carry said filling and said ohmically heating; and
   discharging molten glass continuously from said melting tank in accordance with the amount of the molten glass or the glass material supplied to said melting tank.

17. A method of manufacturing a substrate for an information recording medium, comprising steps of:
   manufacturing a glass blank by a glass manufacturing method for mass-producing glass with a glass melting furnace, said glass melting furnace comprising: a melting tank, at least a wall surface in contact with molten glass thereof being made of refractory material; at least one pair of electrodes placed so as to be in contact with said molten glass held in said melting tank for ohmically heating said molten glass held in said melting tank; and at least one metallic member, at least a surface of which is made of metal and placed so as to be substantially always in contact with said molten glass held in said melting tank; wherein: every one of said at least one metallic member is, when said melting tank is filled with said molten glass, placed so as to be substantially always outside an electric current flowing region which is formed by said at least one pair of electrodes into said molten glass held in said melting tank; and
   grinding/polishing a main surface of said glass blank to manufacture a substrate for an information recording medium; and
   wherein the electric current flowing region comprises:
      a first region in which a pair of the electrodes are immediately opposed to each other; and
      a second region up to 60 degrees upward and up to 30 degrees sideways and downward from the end of the electrodes from the first region.

18. A method of manufacturing a substrate for an information recording medium, comprising steps of:
   manufacturing a glass blank by a glass manufacturing method for mass-producing glass with a glass melting furnace, said glass melting furnace comprising: a melting tank, at least a wall surface in contact with molten glass thereof being made of refractory material; at least one pair of electrodes placed so as to be in contact with said molten glass held in said melting tank for ohmically heating said molten glass held in said melting tank; and at least one metallic member, at least a surface of which is made of metal and placed so as to be substantially always in contact with said molten glass held in said melting tank; wherein: every one of said at least one metallic member is, when said melting tank is filled with said molten glass, placed so as to be substantially always outside an electric current flowing region which is formed by said at least one pair of electrodes into said molten glass held in said melting tank;
   grinding and/or polishing a main surface of said glass blank to form a substrate; and
   forming an information recording layer on said main surface of said substrate to produce an information recording medium; and
   wherein the electric current flowing region comprises:
      a first region in which a pair of the electrodes are immediately opposed to each other; and
      a second region up to 60 degrees upward and up to 30 degrees sideways and downward from the end of the electrodes from the first region.

19. A method of manufacturing a substrate for a display, comprising steps of:
   manufacturing a glass blank by a glass manufacturing method for mass-producing glass with a glass melting furnace, said glass melting furnace comprising: a melting tank, at least a wall surface in contact with molten glass thereof being made of refractory material; at least one pair of electrodes placed so as to be in contact with said molten glass held in said melting tank for ohmically heating said molten glass held in said melting tank; and at least one metallic member, at least a surface of which is made of metal and placed so as to be substantially always in contact with said molten glass held in said melting tank; wherein: every one of said at least one metallic member is, when said melting tank is filled with said molten glass, placed so as to be substantially always outside an electric current flowing region which is formed by said at least one pair of electrodes into said molten glass held in said melting tank; and using said glass blank to produce a substrate for a display; and wherein the electric current flowing region comprises:
   a first region in which a pair of the electrodes are immediately opposed to each other; and
   a second region up to 60 degrees upward and up to 30 degrees sideways and downward from the end of the electrodes from the first region.

20. An optical component manufacturing method comprising steps of:
   manufacturing a glass blank by a glass manufacturing method for mass-producing glass with a glass melting furnace, said glass melting furnace comprising: a melting tank, at least a wall surface in contact with molten glass thereof being made of refractory material; at least one pair of electrodes placed so as to be in contact with said molten glass held in said melting tank for ohmically heating said molten glass held in said melting tank; and at least one metallic member, at least a surface of which is made of metal and placed so as to be substantially always in contact with said molten glass held in said melting tank; wherein: every one of said at least one metallic member is, when said melting tank is filled with said molten glass, placed so as to be substantially always outside an electric current flowing region which is formed by said at least one pair of electrodes into said molten glass held in said melting tank; and grinding and/or polishing a main surface of said glass blank to form an optical component; and wherein the electric current flowing region comprises:
      a first region in which a pair of the electrodes are immediately opposed to each other; and
      a second region up to 60 degrees upward and up to 30 degrees sideways and downward from the end of the electrodes from the first region.

21. A glass manufacturing method for mass-producing glass with a glass melting furnace by:
   filing a melting tank of said glass melting furnace with molten glass;
   ohmically heating said molten glass held in said melting tank by means of at least one pair of electrodes placed so as to be in contact with said molten glass; and
   placing at least one metallic member, of which at least a surface is made of metal, to contact with said molten glass; wherein
   said placing is carried before the start of said mass producing of glass for every one of said at least one metallic member to be fixedly placed away from said at least one pair of electrodes in a low erosion region where erosion caused by increasing of cumulative contact between the molten glass held in said melting tank and the wall surface of said melting tank is estimated to be smaller then that of the other region at the end of said mass-producing of glass, substantially flush with the wall surface of said melting tank; and
   every one of said at least one metallic member is, when said melting tank is filled with said molten glass, placed so as to be substantially always outside an electric current flowing region which is formed by said at least one pair of electrodes into said molten glass held in said melting tank; and
   the electric current flowing region comprises:
      a first region in which a pair of the electrodes are immediately opposed to each other; and
   a second region up to 60 degrees upward and up to 30 degrees sideways and downward from the end of the electrodes from the first region.

\* \* \* \* \*